United States Patent
Jin et al.

(10) Patent No.: US 11,024,440 B2
(45) Date of Patent: Jun. 1, 2021

(54) CONDUCTIVE THERMOPLASTIC ELASTOMER COMPOSITION

(71) Applicant: ENEOS CORPORATION, Tokyo (JP)

(72) Inventors: Zhengzhe Jin, Tokyo (JP); Keisuke Chino, Tokyo (JP); Yusuke Matsuo, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 16/464,052

(22) PCT Filed: Nov. 2, 2017

(86) PCT No.: PCT/JP2017/039790
§ 371 (c)(1),
(2) Date: May 24, 2019

(87) PCT Pub. No.: WO2018/096910
PCT Pub. Date: May 31, 2018

(65) Prior Publication Data
US 2019/0385763 A1    Dec. 19, 2019

(30) Foreign Application Priority Data
Nov. 24, 2016 (JP) .............................. JP2016-227635

(51) Int. Cl.
*H01B 1/24* (2006.01)
*C08L 23/06* (2006.01)
*C08L 91/00* (2006.01)

(52) U.S. Cl.
CPC ................ *H01B 1/24* (2013.01); *C08L 23/06* (2013.01); *C08L 91/00* (2013.01); *C08L 2203/20* (2013.01); *C08L 2205/025* (2013.01); *C08L 2205/035* (2013.01); *C08L 2207/04* (2013.01); *C08L 2207/322* (2013.01)

(58) Field of Classification Search
CPC ........................................................ H01B 1/24
See application file for complete search history.

(56) References Cited

U.S. PATENT DOCUMENTS

| | | | | |
|---|---|---|---|---|
| 4,525,297 A | * | 6/1985 | Yamane | C08J 9/0066 252/511 |
| 4,525,492 A | * | 6/1985 | Rastall | C08G 14/06 521/128 |
| 5,332,762 A | * | 7/1994 | Maschberger | C08J 9/125 521/91 |
| 5,333,662 A | | 8/1994 | Costemalle et al. | |
| 5,386,864 A | | 2/1995 | Costemalle et al. | |
| 2003/0125438 A1 | | 7/2003 | Graf et al. | |
| 2006/0094829 A1 | | 5/2006 | Chino et al. | |
| 2009/0030099 A1 | * | 1/2009 | Chino | C08L 2666/24 521/139 |
| 2010/0105798 A1 | * | 4/2010 | Hasegawa | C08L 33/20 522/99 |
| 2018/0051171 A1 | * | 2/2018 | Prissok | C08L 75/04 |
| 2018/0079887 A1 | | 3/2018 | Chino et al. | |

FOREIGN PATENT DOCUMENTS

| | | |
|---|---|---|
| EP | 0372343 A1 * | 6/1990 |
| JP | H5-507952 A | 11/1993 |
| JP | H5-508435 A | 11/1993 |
| JP | 2004-307576 A | 11/2004 |
| JP | 2005-513221 A | 5/2005 |
| JP | 2006-131663 A | 5/2006 |
| JP | 2006-232965 A | 9/2006 |
| JP | 2006-232983 A | 9/2006 |
| JP | 2007-056145 A | 3/2007 |
| JP | 2008-88194 A | 4/2008 |
| JP | 2009-286183 A | 12/2009 |
| JP | 2014-028890 A | 2/2014 |
| JP | 5918878 B1 | 5/2016 |
| JP | 2017-057323 A | 3/2017 |
| WO | 2011/114990 A1 | 9/2011 |

OTHER PUBLICATIONS

May 28, 2019 International Preliminary Report on Patentability issued in International Patent Application No. PCT/JP2017/039790.
Feb. 6, 2018 International Search Report issued in International Patent Application No. PCT/JP2017/039790.
Apr. 20, 2020 Office Action issued in Japanese Patent Application No. 2016-227635.
Jul. 1, 2020 Supplementary European Search Report issued in European Patent Application No. 17 87 4250.8.

* cited by examiner

*Primary Examiner* — William D Young
(74) *Attorney, Agent, or Firm* — Oliff PLC

(57) ABSTRACT

A conductive thermoplastic elastomer composition includes: a specific elastomer component; a clay; a paraffin oil; and a carbon-based filler having a BET specific surface area of 50 m$^2$/g or more, wherein a content ratio of the clay is 20 parts by mass or less relative to 100 parts by mass of the elastomer component, and a content ratio of the paraffin oil is 1 to 65% by mass relative to a total amount of the composition.

17 Claims, No Drawings

CONDUCTIVE THERMOPLASTIC ELASTOMER COMPOSITION

TECHNICAL FIELD

The present invention relates to a conductive thermoplastic elastomer composition.

BACKGROUND ART

Thermoplastic elastomers are materials which are industrially very useful because they can be melted at molding temperature during a molding process and can be shaped by a known resin molding technique. As an example of such thermoplastic elastomers, Japanese Patent No. 5918878 (PTL 1) discloses a thermoplastic elastomer composition comprising a clay and at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below.

CITATION LIST

Patent Literature

[PTL 1] Japanese Patent No. 5918878

SUMMARY OF INVENTION

Technical Problem

Such a thermoplastic elastomer composition as described in PTL 1 above, however, is not necessarily sufficient in terms of exerting conductivity and resistance to compression set at high levels in a well-balanced manner.

The present invention has been made in view of the problems in the conventional techniques, and an object of the present invention is to provide a conductive thermoplastic elastomer composition having conductivity and resistance to compression set at high levels in a well-balanced manner.

Solution to Problem

The present inventors have conducted intensive study to achieve the above-described object, and consequently have found that a conductive thermoplastic elastomer composition can have conductivity and resistance to compression set at high levels in a well-balanced manner (have a sufficiently high level of conductivity and a sufficiently high level of resistance to compression set in a well-balanced manner) when the conductive thermoplastic elastomer composition comprises: at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; a clay; a paraffin oil; and a carbon-based filler having a BET specific surface area of 50 $m^2$/g or more, wherein a content ratio of the clay is 20 parts by mass or less relative to 100 parts by mass of the elastomer component, and further a content ratio of the paraffin oil is 1 to 65% by mass relative to a total amount of the composition. This finding has led to the completion of the present invention.

Specifically, a conductive thermoplastic elastomer composition of the present invention comprises:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

a clay;

a paraffin oil; and a carbon-based filler having a BET specific surface area of 50 $m^2$/g or more, wherein a content ratio of the clay is 20 parts by mass or less relative to 100 parts by mass of the elastomer component, and a content ratio of the paraffin oil is 1 to 65% by mass relative to a total amount of the composition.

In the conductive thermoplastic elastomer composition of the present invention, the carbon-based filler is preferably at least one selected from the group consisting of carbon blacks and carbon nanotubes, and more preferably Ketjen black.

In addition, in the conductive thermoplastic elastomer composition of the present invention, a content ratio of the carbon-based filler is preferably 0.1 to 50% by mass relative to the total amount of the composition.

In addition, in the conductive thermoplastic elastomer composition of the present invention, the clay is preferably an organically modified clay.

Advantageous Effects of Invention

The present invention makes it possible to provide a conductive thermoplastic elastomer composition having conductivity and resistance to compression set at high levels in a well-balanced manner.

DESCRIPTION OF EMBODIMENTS

Hereinafter, the present invention will be described in detail based on preferred embodiments thereof.

A conductive thermoplastic elastomer composition of the present invention comprises:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

a clay;

a paraffin oil; and a carbon-based filler having a BET specific surface area of 50 $m^2$/g or more, wherein a content ratio of the clay is 20 parts by mass or less relative to 100 parts by mass of the elastomer component, and a content ratio of the paraffin oil is 1 to 65% by mass relative to a total amount of the composition.

Here, first, separate description is provided for each of the components contained in the conductive thermoplastic elastomer composition of the present invention.

(Elastomer Component)

The elastomer component is at least one selected from the group consisting of the above-described elastomeric polymers (A) and (B). In each of the elastomeric polymers (A) and (B), the "side chain" refers to a side chain and a terminal of the elastomeric polymer. In addition, "a side chain (a) containing a hydrogen-bond cross-linkable moiety having a carbonyl-containing group and/or a nitrogen-containing heterocycle" means that a carbonyl-containing group and/or a nitrogen-containing heterocycle (more preferably a carbonyl-containing group and a nitrogen-containing heterocycle) serving as a hydrogen-bond cross-linkable moiety is chemically stably bonded (covalently bonded) to an atom (generally, a carbon atom) forming a main chain of the elastomeric polymer. In addition, the "containing a hydrogen-bond cross-linkable moiety and a covalent-bond cross-linking moiety in a side chain" is a concept including a case where side chains of both a side chain having a hydrogen-bond cross-linkable moiety (hereinafter, sometimes referred to as "side chain (a')" for convenience) and a side chain having a covalent-bond cross-linking moiety (hereinafter, sometimes referred to as "side chain (b)" for convenience) are contained, so that the side chains of the polymer contain both a hydrogen-bond cross-linkable moiety and a covalent-bond cross-linking moiety, as well as a case where a side chain having both a hydrogen-bond cross-linkable moiety and a covalent-bond cross-linking moiety (a single side chain containing both a hydrogen-bond cross-linkable moiety and a covalent-bond cross-linking moiety therein: hereinafter, such a side chain is sometimes referred to as "side chain (c)" for convenience) is contained, so that the side chain of the polymer contain both a hydrogen-bond cross-linkable moiety and a covalent-bond cross-linking moiety.

The main chain (polymer forming a main chain portion) of each of the elastomeric polymers (A) and (B) may be generally a known natural polymer or a synthetic polymer, wherein the polymer has a glass-transition point of room temperature (25° C.) or lower (the main chain may be a so-called elastomer), and is not particularly limited. Accordingly, the elastomeric polymers (A) and (B) may be, for example, those which have an elastomeric polymer being a natural polymer, a synthetic polymer, or the like and having a glass-transition point of room temperature (25° C.) or lower as a main chain, and which contain a side chain (a) containing a hydrogen-bond cross-linkable moiety having a carbonyl-containing group and/or a nitrogen-containing heterocycle; those which have an elastomeric polymer being a natural polymer, a synthetic polymer, or the like and having a glass-transition point of room temperature (25° C.) or lower as a main chain, and which contain a side chain (a') having a hydrogen-bond cross-linkable moiety and a side chain (b) having a covalent-bond cross-linking moiety as side chains; those which have an elastomeric polymer being a natural polymer, a synthetic polymer, or the like and having a glass-transition point of room temperature (25° C.) or lower as a main chain, and which contain a side chain (c) containing both a hydrogen-bond cross-linkable moiety and a covalent-bond cross-linking moiety; or the like.

Examples of the main chains (polymers forming main chain portions) of these elastomeric polymers (A) and (B) include diene-based rubbers such as natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), and ethylene-propylene-diene rubber (EPDM), as well as hydrogenated products thereof; olefin-based rubbers such as ethylene-propylene rubber (EPM), ethylene-acrylic rubber (AEM), ethylene-butene rubber (EBM), chlorosulfonated polyethylene, acrylic rubber, fluororubber, polyethylene rubber, and polypropylene rubber; epichlorohydrin rubber; polysulfide rubbers; silicone rubbers; urethane rubbers; and the like.

The main chains of the elastomeric polymers (A) and (B) (polymers forming main chain portions) may also be those formed of an elastomeric polymer containing a resin component, and examples thereof include optionally hydrogenated polystyrene-based elastomeric polymers (for example, SBS, SIS, SEBS, and the like), polyolefin-based elastomeric polymers, polyvinyl chloride-based elastomeric polymers, polyurethane-based elastomeric polymers, polyester-based elastomeric polymers, polyamide-based elastomeric polymers, and the like.

The main chains of the elastomeric polymers (A) and (B) are each preferably at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers. In addition, the main chains of the elastomeric polymers (A) and (B) are each preferably a hydrogenated product of a diene-based rubber or an olefin-based rubber from the viewpoint of the absence of a double bond susceptible to aging, and preferably a diene-based rubber from the viewpoints of the low cost and the high reactivity (the presence of many double bonds capable of an ene reaction with a compound such as maleic anhydride).

Moreover, the elastomeric polymers (A) and (B) may be liquid or solid, and the molecular weights thereof are not particularly limited. The molecular weights may be selected, as appropriate, according to the application for which the conductive thermoplastic elastomer composition of the present invention is used, required physical properties, or the like.

When the flowability upon heating (de-cross-linking, or the like) of the conductive thermoplastic elastomer composition of the present invention is important, the above-described elastomeric polymers (A) and (B) are preferably liquid. For example, when the main chain portion is a diene-based rubber such as isoprene rubber or butadiene rubber, the weight average molecular weight of the main chain portion is preferably 1,000 to 100,000 and is particularly preferably about 1,000 to 50,000 to make the elastomeric polymers (A) and (B) liquid.

On the other hand, when the strength of the conductive thermoplastic elastomer composition of the present invention is important, the elastomeric polymers (A) and (B) are preferably solid. For example, when the main chain portion is a diene-based rubber such as isoprene rubber or butadiene rubber, the weight average molecular weight of the main chain portion is preferably 100,000 or higher, and particularly preferably about 500,000 to U.S. Pat. No. 1,500,000 to make the elastomeric polymers (A) and (B) solid.

The weight average molecular weight is a weight average molecular weight (in terms of polystyrene) measured by gel permeation chromatography (GPC). It is preferable to use tetrahydrofuran (THF) as a solvent for the measurement.

In the conductive thermoplastic elastomer composition of the present invention, a mixture of two or more of the elastomeric polymers (A) and (B) can be used. In this case, the mixing ratio of the elastomeric polymers can be any according to the application for which the conductive thermoplastic elastomer composition of the present invention is used, a required physical property, or the like.

In addition, the glass-transition points of the elastomeric polymers (A) and (B) are 25° C. or below as mentioned above. This is because when the glass-transition points of the elastomeric polymers are within this range, the conductive thermoplastic elastomer composition of the present invention exhibits rubber-like elasticity at room temperature. Meanwhile, the "glass-transition point" in the present invention is a glass-transition point measured by differential scanning calorimetry (DSC). For the measurement, the rate of temperature rise is preferably 10° C./min.

The main chains of the elastomeric polymers (A) and (B) are preferably diene-based rubbers such as natural rubber (NR), isoprene rubber (IR), butadiene rubber (BR), 1,2-butadiene rubber, styrene-butadiene rubber (SBR), ethylene-propylene-diene rubber (EPDM), or butyl rubber (IIR); or olefin-based rubbers such as ethylene-propylene rubber (EPM), ethylene-acrylic rubber (AEM), or ethylene-butene rubber (EBM), because the resultant elastomeric polymers (A) and (B) have glass-transition points of 25° C. or below, and a formed article made of the obtained conductive thermoplastic elastomer composition shows rubber-like elasticity at room temperature (25° C.) In addition, when an olefin-based rubber is used as the main chain of each of the elastomeric polymers (A) and (B), the obtained conductive thermoplastic elastomer composition tends to have an improved tensile strength, and degradation of the composition tends to be suppressed more sufficiently because of the absence of double bonds.

The bound styrene content of the styrene-butadiene rubber (SBR) which can be used as the elastomeric polymers (A) and (B), the hydrogenation ratio of the hydrogenated elastomeric polymer which can be used as the elastomeric polymers (A) and (B), and the like are not particularly limited, and can be adjusted to any ratio according to the application for which the conductive thermoplastic elastomer composition of the present invention is used, a physical property required for the composition, or the like.

In addition, when ethylene-propylene-diene rubber (EPDM), ethylene-acrylic rubber (AEM), ethylene-propylene rubber (EPM), or ethylene-butene rubber (EBM) is used as the main chain of the above-described elastomeric polymer (A) or (B), the degree of crystallinity therein is preferably less than 10% (more preferably 5 to 0%) especially from the viewpoint of expression of favorable rubber-like elasticity at room temperature. Moreover, when ethylene-propylene-diene rubber (EPDM), ethylene-acrylic rubber (AEM), ethylene-propylene rubber (EPM), or ethylene-butene rubber (EBM) is used as the main chain of the above-described elastomeric polymer (A) or (B), the ethylene content therein is preferably 10 to 90% by mole, and more preferably 30 to 90% by mole. The ethylene content within this range is preferable, because a thermoplastic elastomer (composition) formed therefrom is excellent in compression set and mechanical strengths, especially, tensile strength.

Further, the above-described elastomeric polymer (A) or (B) is preferably amorphous from the viewpoint of expression of favorable rubber-like elasticity at room temperature. Moreover, such elastomeric polymer (A) or (B) may be an elastomer partially having crystallinity (crystal structure), but even in this case, the degree of crystallinity is preferably less than 10% (particularly preferably 5 to 0%). Here, such a degree of crystallinity can be obtained in such a way that diffraction peaks are measured by using an X-ray diffraction instrument (for example, one manufactured by Rigaku Corporation under the trade name "MiniFlex 300") as a measurement instrument and an integral ratio between the scattering peaks derived from the crystalline and amorphous structures is calculated.

In addition, as described above, the above-described elastomeric polymers (A) and (B) have, as a side chain, at least one of a side chain (a) containing a hydrogen-bond cross-linkable moiety having a carbonyl-containing group and/or a nitrogen-containing heterocycle; a side chain (a') containing a hydrogen-bond cross-linkable moiety and a side chain (b) containing a covalent-bond cross-linking moiety; and a side chain (c) containing a hydrogen-bond cross-linkable moiety and a covalent-bond cross-linking moiety. Note that, in the present invention, the side chain (c) can also be regarded as a side chain functioning as a side chain (a') and also as a side chain (b). Each of the side chains is described below.

<Side Chain (a'): Side Chain Containing Hydrogen-Bond Cross-Linkable Moiety>

The side chain (a') containing a hydrogen-bond cross-linkable moiety may be any, and the structure thereof is not particularly limited, as long as the side chain has a group that can form a cross-linkage by a hydrogen bond (for example, a hydroxy group, a hydrogen-bond cross-linkable moiety contained in the side chain (a) described later, or the like), and forms a hydrogen bond on the basis of the group. Here, the hydrogen-bond cross-linkable moiety is a moiety through which polymer molecules (elastomer molecules) are cross-linked by a hydrogen bond. Note that the cross-linkage by a hydrogen bond is formed only when there are a hydrogen acceptor (a group containing an atom containing lone pair electrons, or the like) and a hydrogen donor (a group having a hydrogen atom covalently bonded to an atom having a high electronegativity, or the like). Hence, when both a hydrogen acceptor and a hydrogen donor are not present in side chains of elastomer molecules, no cross-linkage by a hydrogen bond is formed. For this reason, only when both a hydrogen acceptor and a hydrogen donor are present in side chains of elastomer molecules, a hydrogen-bond cross-linkable moiety can be considered to be present in the system. Note that, in the present invention, if both a portion that can functions as a hydrogen acceptor (for example, a carbonyl group or the like) and a portion that can functions as a hydrogen donor (for example, a hydroxy group or the like) are present in side chains of elastomer molecules, the portion that can functions as a hydrogen acceptor and the portion that can functions as a donor of the side chains are considered to be hydrogen-bond cross-linkable moieties.

The hydrogen-bond cross-linkable moiety in such a side chain (a') is preferably a hydrogen-bond cross-linkable moiety having a carbonyl-containing group and/or a nitrogen-containing heterocycle (a hydrogen-bond cross-linkable moiety contained in the side chain (a)), which will be described below, from the viewpoints of the formation of a stronger hydrogen bond and the like. Specifically, the side chain (a') is more preferably the side chain (a) described later. Moreover, from the same viewpoints, the hydrogen-bond cross-linkable moiety in the side chain (a') is more preferably a hydrogen-bond cross-linkable moiety having a carbonyl-containing group and a nitrogen-containing heterocycle.

<Side Chain (a): Side Chain Containing Hydrogen-Bond Cross-Linkable Moiety Having Carbonyl-Containing Group and/or Nitrogen-Containing Heterocycle>

The side chain (a) containing a hydrogen-bond cross-linkable moiety having a carbonyl-containing group and/or a nitrogen-containing heterocycle may be any, as long as the side chain (a) has a carbonyl-containing group and/or a nitrogen-containing heterocycle, and the other aspect of the structure are not particularly limited. The hydrogen-bond cross-linkable moiety more preferably has a carbonyl-containing group and a nitrogen-containing heterocycle.

The carbonyl-containing group is not particularly limited, as long as the group contains a carbonyl group. Specific examples thereof include amide, ester, imide, carboxy group, carbonyl group, and the like. The carbonyl-containing group may be a group introduced to the main chain (the polymer of the main chain portion) by using a compound capable of introducing a carbonyl-containing group to a main chain. The compound capable of introducing a carbonyl-containing group to a main chain is not particularly limited, and specific examples thereof include ketones, carboxylic acids, derivatives thereof, and the like.

Examples of the carboxylic acids include organic acids having saturated or unsaturated hydrocarbon groups, and the hydrocarbon groups may be any of aliphatic, alicyclic, or aromatic ones, and the like. Specific examples of the carboxylic acid derivatives include carboxylic anhydrides, amino acids, thiocarboxylic acids (mercapto group-containing carboxylic acids), esters, amino acids, ketones, amides, imides, dicarboxylic acids and their monoesters, and the like.

In addition, specific examples of the carboxylic acids, the derivatives thereof, and the like include carboxylic acids such as malonic acid, maleic acid, succinic acid, glutaric acid, phthalic acid, isophthalic acid, terephthalic acid, p-phenylenediacetic acid, p-hydroxybenzoic acid, p-aminobenzoic acid, and mercaptoacetic acid, as well as these carboxylic acids containing substituents; acid anhydrides such as succinic anhydride, maleic anhydride, glutaric anhydride, phthalic anhydride, propionic anhydride, and benzoic anhydride; aliphatic esters such as maleic acid esters, malonic acid esters, succinic acid esters, glutaric acid esters, and ethyl acetate; aromatic esters such as phthalic acid esters, isophthalic acid esters, terephthalic acid esters, ethyl-m-aminobenzoate, and methyl-p-hydroxybenzoate; ketones such as quinone, anthraquinone, and naphthoquinone; amino acids such as glycine, tyrosine, bicine, alanine, valine, leucine, serine, threonine, lysine, aspartic acid, glutamic acid, cysteine, methionine, proline, and N-(p-aminobenzoyl)-β-alanine; amides such as maleamide, maleamidic acid (maleic monoamide), succinic monoamide, 5-hydroxy-valeramide, N-acetylethanolamine, N,N'-hexamethylene bis(acetamide), malonamide, cycloserine, 4-acetamidophenol, and p-acetamidebenzoic acid; imides such as maleimide and succinimide; and the like.

Of these examples, the compound capable of introducing a carbonyl group (carbonyl-containing group) is preferably a cyclic acid anhydride such as succinic anhydride, maleic anhydride, glutaric anhydride, or phthalic anhydride, and is particularly preferably maleic anhydride.

In addition, when the side chain (a) has a nitrogen-containing heterocycle, the structure or the like of the nitrogen-containing heterocycle is not particularly limited, as long as the nitrogen-containing heterocycle is introduced to the main chain directly or through an organic group. It is also possible to use, as the nitrogen-containing heterocycle, one containing a heteroatom other than a nitrogen atom, such as a sulfur atom, an oxygen atom, or a phosphorus atom, in the heterocycle, as long as a nitrogen atom is contained in the heterocycle. Here, the use of the nitrogen-containing heterocycle in the side chain (a) is preferable because the presence of the heterocycle structure results in a stronger hydrogen bond forming the cross-linkage, so that the obtained thermoplastic elastomer composition of the present invention has an improved tensile strength.

In addition, the above-described nitrogen-containing heterocycle may have a substituent, and examples of the substituent include alkyl groups such as a methyl group, an ethyl group, an (iso)propyl group, and a hexyl group; alkoxy groups such as a methoxy group, an ethoxy group, and an (iso)propoxy group; groups consisting of a halogen atom such as a fluorine atom, a chlorine atom, a bromine atom, or an iodine atom; a cyano group; an amino group; an aromatic hydrocarbon group; an ester group; an ether group; an acyl group; a thioether group; and the like, any ones of which can also be used in combination. The position of substitution of such a substituent is not particularly limited, and the number of such substituents is not limited.

Moreover, the above-described nitrogen-containing heterocycle may have aromatic properties, but does not necessarily have to have aromatic properties. A nitrogen-containing heterocycle having aromatic properties is preferable, because the obtained conductive thermoplastic elastomer composition of the present invention is further improved in compression set and mechanical strength.

In addition, such a nitrogen-containing heterocycle is preferably, but not particularly limited to, a 5-membered ring or a 6-membered ring, from the viewpoints that the hydrogen bond becomes more strongly, and the compression set and the mechanical strength are further improved. Specific examples of the nitrogen-containing heterocycle include pyrrololine, pyrrolidone, oxindole (2-oxindole), indoxyl (3-oxindole), dioxindole, isatin, indolyl, phthalimidine, β-isoindigo, monoporphyrin, diporphyrin, triporphyrin, azaporphyrin, phthalocyanine, hemoglobin, uroporphyrin, chlorophyll, phylloerythrin, imidazole, pyrazole, triazole, tetrazole, benzimidazole, benzopyrazole, benzotriazole, imidazoline, imidazolone, imidazolidone, hydantoin, pyrazoline, pyrazolone, pyrazolidone, indazole, pyridoindole, purine, cinnoline, pyrrole, pyrroline, indole, indoline, oxylindole, carbazole, phenothiazine, indolenine, isoindole, oxazole, triazole, isoxazole, isothiazole, oxadiazole, thiadiazole, oxatriazole, thiatriazole, phenanthroline, oxazine, benzoxazine, phthalazine, pteridine, pyrazine, phenazine, tetrazine, benzoxazole, benzoisoxazole, anthranyl, benzothiazole, benzofurazan, pyridine, quinoline, isoquinoline, acridine, phenanthridine, anthrazoline, naphthyridine, triazine, pyridazine, pyrimidine, quinazoline, quinoxaline, triazine, histidine, triazolidine, melamine, adenine, guanine, thymine, cytosine, hydroxyethyl isocyanurate, derivatives thereof, and the like. Of these examples, preferred examples of particularly the 5-membered nitrogen-containing rings include the compounds described below (cyclic structures represented by the chemical formulae), triazole derivatives represented by the following general formula (10), and imidazole derivatives represented by the following general formula (11). In addition, these may have the above-described various substituents, and may be subjected to hydrogen addition or elimination.

[Chem. 1]

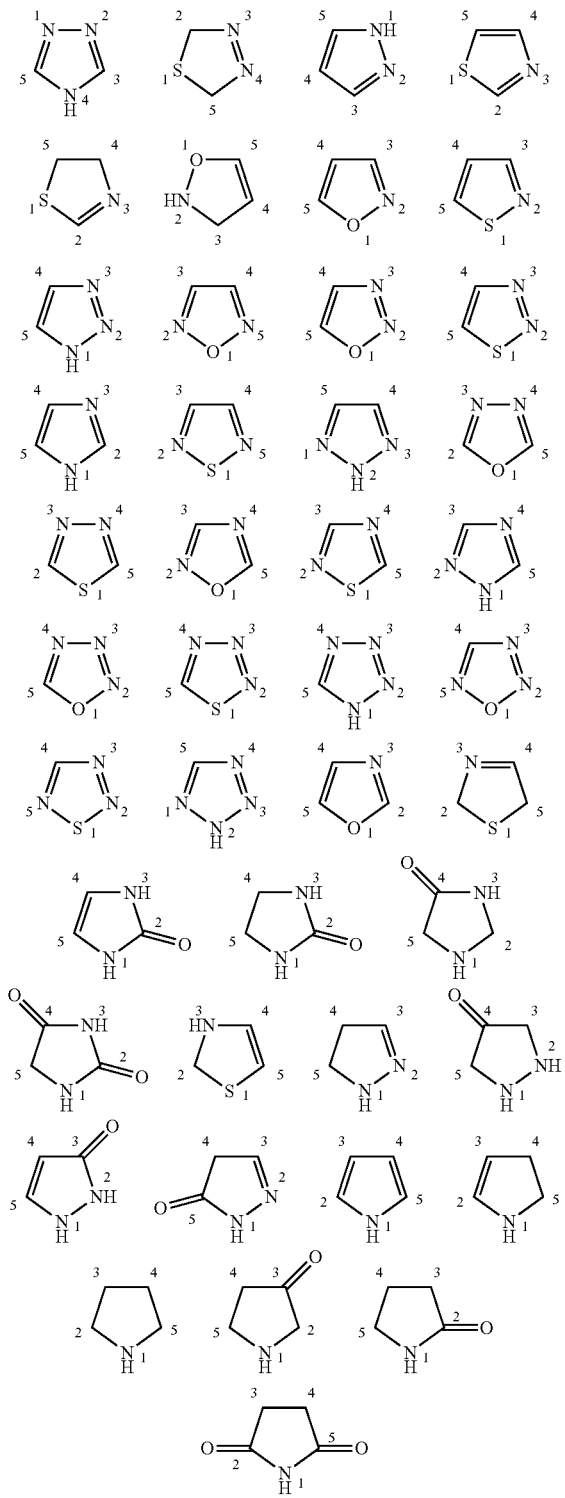

[Chem. 2]

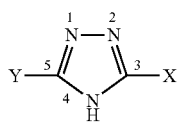
(10)

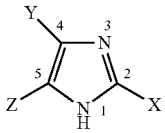
(11)

The substituents X, Y, and Z in the general formulae (10) and (11) are each independently a hydrogen atom, an alkyl group having 1 to 30 carbon atoms, an aralkyl group having 7 to 20 carbon atoms, an aryl group having 6 to 20 carbon atoms, or an amino group. Note that one of X and Y in the above-described general formula (10) is not a hydrogen atom, and similarly at least one of X, Y, and Z in the above-described general formula (11) is not a hydrogen atom.

In addition to a hydrogen atom and an amino group, specific examples of the substituents X, Y, and Z include, linear-chain alkyl groups such as a methyl group, an ethyl group, a propyl group, a butyl group, a pentyl group, an octyl group, a dodecyl group, and a stearyl group; branched alkyl groups such as an isopropyl group, an isobutyl group, a s-butyl group, a t-butyl group, an isopentyl group, a neo-pentyl group, a t-pentyl group, a 1-methylbutyl group, a 1-methylheptyl group, and a 2-ethylhexyl group; aralkyl groups such as a benzyl group and a phenethyl group; aryl groups such as a phenyl group, tolyl groups (o-, m-, and p-), a dimethylphenyl group, and a mesityl group; and the like.

Of these examples, the substituents X, Y, and Z are each preferably an alkyl group, especially, a butyl group, an octyl group, a dodecyl group, an isopropyl group, or a 2-ethylhexyl group, because the obtained conductive thermoplastic elastomer composition of the present invention has good processability.

Meanwhile, preferred examples of the nitrogen-containing 6-membered rings include the compounds described below. These compounds may also have the above-described various substituents (for example, the substituents which may be possessed by the above-described nitrogen-containing heterocycles), or may also be subjected to hydrogen addition or hydrogen elimination.

[Chem. 3]

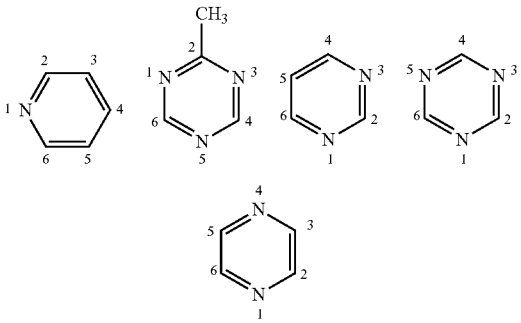

In addition, it is also possible to use condensation products of any one of the above-described nitrogen-containing heterocycles with a benzene ring or condensation products of any ones of the nitrogen-containing heterocycles, and specific preferred examples thereof include condensed rings shown below. These condensed rings may also have the above-described various substituents, and may also be subjected to addition or elimination of hydrogen atoms.

[Chem. 4]

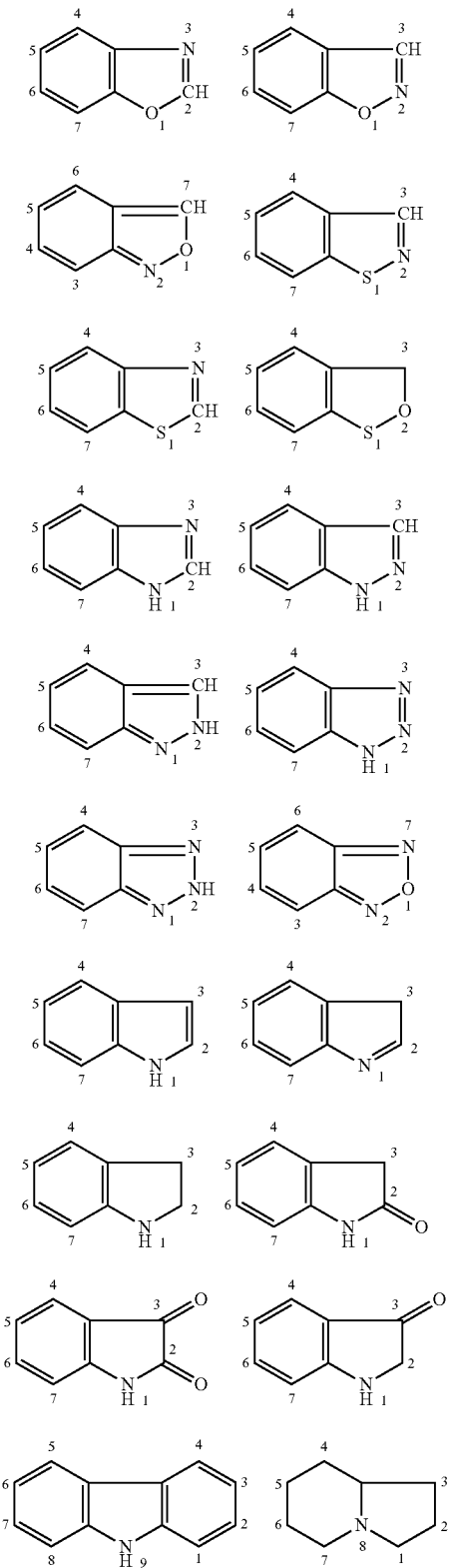

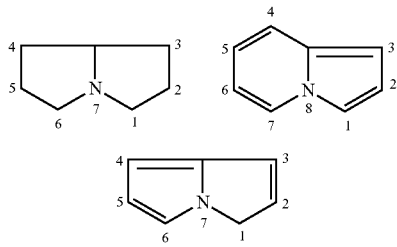

Among others, the nitrogen-containing heterocycle is preferably at least one selected from a triazole ring, an isocyanurate ring, a thiadiazole ring, a pyridine ring, an imidazole ring, a triazine ring, and a hydantoin ring, and is preferably at least one selected from a triazole ring, a thiadiazole ring, a pyridine ring, an imidazole ring, and a hydantoin ring, because the obtained conductive thermoplastic elastomer composition of the present invention is excellent in recyclability, compression set, hardness, and mechanical strengths, especially, tensile strength.

In addition, when the side chain (a) contains both the above-described carbonyl-containing group and the above-described nitrogen-containing heterocycle, the above-described carbonyl-containing group and the above-described nitrogen-containing heterocycle may be introduced to the main chain as side chains independent from each other, and are preferably introduced to the main chain as a single side chain in which the above-described carbonyl-containing group and the above-described nitrogen-containing heterocycle are linked to each other through another group. Accordingly, as the side chain (a), it is preferable that a side chain containing a hydrogen-bond cross-linkable moiety having the above-described carbonyl-containing group and the above-described nitrogen-containing heterocycle be introduced to the main chain as a single side chain, and it is more preferable that a side chain containing a structural portion represented by the following general formula (1):

[Chem. 5]

[in the formula (1), A is a nitrogen-containing heterocycle, and B is a single bond; an oxygen atom, an amino group represented by a formula NR' (R' is a hydrogen atom or an alkyl group having 1 to 10 carbon atoms), or a sulfur atom; or an organic group optionally containing any of the atoms or groups] be introduced to the main chain as a single side chain. Accordingly, the hydrogen-bond cross-linkable moiety of the side chain (a) preferably contains a structural portion represented by the above-described general formula (1).

Here, a specific example of the nitrogen-containing heterocycle A in the above-described formula (1) is any of the nitrogen-containing heterocycles listed above as the examples. In addition, a specific example of the substituent B in the above-described formula (1) is a single bond; an oxygen atom, a sulfur atom, or an amino group represented by the formula NR' (where R' is a hydrogen atom or an alkyl group having 1 to 10 carbon atoms) (hereinafter, an amino group represented by the formula NR' is simply referred to as "amino group NR'" for convenience); an alkylene or aralkylene group having 1 to 20 carbon atoms and optionally containing any of the atoms or groups; an alkylene ether group (an alkyleneoxy group, for example, —O—CH$_2$CH$_2$— group), an alkyleneamino group (for example, —NH—CH$_2$CH$_2$— group or the like), or an alkylene thioether group (an alkylenethio group, for example, —S—CH$_2$CH$_2$— group) having 1 to 20 carbon atoms and having any of the atoms or groups at a terminal; an aralkylene ether group (an aralkyleneoxy group), an aralkyleneamino group, or an aralkylene thioether group having 1 to 20 carbon atoms and having any of them at a terminal; or the like.

Here, examples of the alkyl group having 1 to 10 carbon atoms selectable as R' in the above amino group NR' include a methyl group, an ethyl group, a propyl group, a butyl group, a pentyl group, a hexyl group, a heptyl group, an octyl group, a nonyl group, a decyl group, isomers thereof, and the like. One serving as the substituent B in the above-described formula (1), i.e., any of the oxygen atom, the sulfur atom, and the amino group NR'; as well as the oxygen atoms, amino groups NR', and sulfur atoms in the alkylene ether group, alkyleneamino group, alkylene thioether group, aralkylene ether group, aralkyleneamino group, aralkylene thioether group having 1 to 20 carbon atoms and having any of the atoms or groups at a terminal, preferably forms a conjugated system, such as an ester group, an amide group, an imide group, or a thioester group, in combination with the adjacent carbonyl group.

Of these examples, the substituent B is preferably an oxygen atom, sulfur atom, or amino group forming a conjugated system; or an alkylene ether group, an alkyleneamino group, or an alkylene thioether group having 1 to 20 carbon atoms, having any of the atoms or groups at a terminal, and forming a conjugated system, and particularly preferably an amino group (NH), an alkyleneamino group (—NH—CH$_2$— group, —NH—CH$_2$CH$_2$— group, or —NH—CH$_2$CH$_2$CH$_2$— group), an alkylene ether group (—O—CH$_2$— group, —O—CH$_2$CH$_2$— group, or —O—CH$_2$CH$_2$CH$_2$— group).

In addition, when the side chain (a) is a side chain containing a hydrogen-bond cross-linkable moiety having the above-described carbonyl-containing group and the above-described nitrogen-containing heterocycle, the hydrogen-bond cross-linkable moiety having the above-described carbonyl-containing group and the above-described nitrogen-containing heterocycle is more preferably a single side chain represented by the following formula (2) or (3), which is introduced to the main chain of the above-described polymer at the α position or β, position of the side chain.

[Chem. 6]

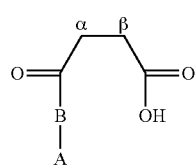

(2)

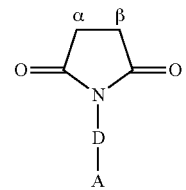

(3)

[In the formula, A is a nitrogen-containing heterocycle, B and D are each independently a single bond; an oxygen atom, an amino group NR' (where R' is a hydrogen atom or an alkyl group having 1 to 10 carbon atoms), or a sulfur atom; or an organic group optionally containing any of the atoms or groups.]

Here, the nitrogen-containing heterocycle A is basically the same as the nitrogen-containing heterocycle A of the above-described formula (1), and the substituents B and D are each independently basically the same as the substituent B in the above-described formula (1). Note that, among the examples listed for the substituent B in the above-described formula (1), the substituent D in the above-described formula (3) is preferably a single bond; an alkylene or aralkylene group having 1 to 20 carbon atoms, optionally containing an oxygen atom, a nitrogen atom, or a sulfur atom, and forming a conjugated system, and is particularly preferably a single bond. Specifically, it is preferable to form an alkyleneamino group or an aralkyleneamino group having 1 to 20 carbon atoms and optionally containing an oxygen atom, a nitrogen atom, or a sulfur atom, together with the imide nitrogen of the above-described formula (3), and it is particularly preferable that the nitrogen-containing heterocycle be directly bonded (through a single bond) to the imide nitrogen of the above-described formula (3). Specific examples of the above-described substituent D include a single bond; the above-described alkylene ether, aralkylene ether group, or the like having 1 to 20 carbon atoms and having an oxygen atom, a sulfur atom, or an amino group at a terminal; a methylene group, an ethylene group, a propylene group, a butylene group, a hexylene group, a phenylene group, and a xylylene group, isomers thereof, and the like.

In addition, when the side chain (a) is a side chain containing a hydrogen-bond cross-linkable moiety having the above-described carbonyl-containing group and the above-described nitrogen-containing heterocycle, the hydrogen-bond cross-linkable moiety of the side chain (a) preferably contains a structural portion represented by the following general formula (101):

[Chem. 7]

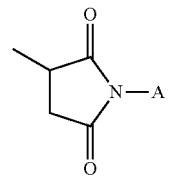

(101)

[in the formula (101), A is a nitrogen-containing heterocycle]. The nitrogen-containing heterocycle A in the formula (101) is basically the same as the nitrogen-containing heterocycle A of the above-described formula (1). In addition, from the viewpoints of high modulus and high strength at break, the hydrogen-bond cross-linkable moiety of the side chain (a) is more preferably one having the structure represented by the following general formula (102):

[Chem. 8]

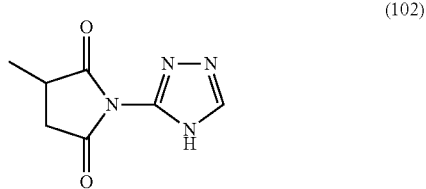

(102)

Moreover, the side chain (a) is particularly preferably a group represented by the above-described general formula (102).

The ratio of the above-described carbonyl-containing group to the above-described nitrogen-containing heterocycle of the above-described thermoplastic elastomer is preferably, but not particularly limited to, 2:1, because complementary interaction is more likely to be created, and because such a thermoplastic elastomer is easy to produce.

The side chain (a) containing a hydrogen-bond cross-linkable moiety having a carbonyl-containing group and/or a nitrogen-containing heterocycle is preferably introduced at a ratio (introduction ratio) of 0.1 to 50% by mole, and more preferably introduced at a ratio of 1 to 30% by mole, relative to 100% by mole of the main chain portion. If the introduction ratio of the side chain (a) is lower than 0.1% by mole, the tensile strength upon the cross-linking may be insufficient in some cases. Meanwhile, if the introduction ratio exceeds 50% by mole, the cross-linking density increases, so that the rubber elasticity may be lost in some cases. Specifically, it is preferable that the introduction ratio be within the above-described range, because the interaction between side chains of the above-described thermoplastic elastomer leads to efficient formation of cross-linkages between molecules, so that the tensile strength is high upon cross-linking, and the recyclability is excellent.

When a side chain (a-i) containing a hydrogen-bond cross-linkable moiety having the above-described carbonyl-containing group and a side chain (a-ii) containing a hydrogen-bond cross-linkable moiety having the above-described nitrogen-containing heterocycle are each independently introduced as the side chain (a), the above-described introduction ratio is calculated by taking a set of the side chain (a-i) containing a carbonyl-containing group and the side chain (a-ii) containing a nitrogen-containing heterocycle as a single side chain (a) based on the ratio between these side chains. Note that when any one of the side chains (a-i) and (a-ii) is in excess, the above-described introduction ratio can be obtained based on the excessive side chain.

In addition, for example, when the main chain portion is ethylene-propylene rubber (EPM), the above-described introduction ratio is such that the amount of monomers to which the side chain portion is introduced is about 0.1 to 50 units per 100 ethylene and propylene monomer units.

In addition, the side chain (a) is preferably a side chain (a) introduced as a side chain of a polymer by using, as a polymer (elastomeric polymer-forming material) which forms the main chain after reaction, a polymer (an elastomeric polymer having a cyclic acid anhydride group in a side chain) having a cyclic acid anhydride group (more preferably a maleic anhydride group) as a functional group, and reacting the functional group (cyclic acid anhydride group) with a compound (a compound capable of introducing a nitrogen-containing heterocycle) that forms a hydrogen-bond cross-linkable moiety upon a reaction with the cyclic acid anhydride group, to form a hydrogen-bond cross-linkable moiety. The compound capable of introducing a nitrogen-containing heterocycle may be one of the nitrogen-containing heterocycles listed as examples above itself, or may be a nitrogen-containing heterocycle having a substituent (for example, a hydroxy group, a thiol group, an amino group, or the like) that reacts with a cyclic acid anhydride group such as maleic anhydride.

Here, the position at which the nitrogen-containing heterocycle is bonded in the side chain (a) is described. Note that the nitrogen heterocycle is referred to as a "nitrogen-containing n-membered ring compound (n≥3)" for convenience.

The bonding positions ("positions 1 to n") described below are based on the IUPAC nomenclature. For example, in a case of a compound having three nitrogen atoms having unshared electron pairs, the bonding position is determined according to the order based on the IUPAC nomenclature. Specifically, the bonding positions are shown in the 5-membered, 6-membered, and condensed nitrogen-containing heterocycles listed as examples above.

In the side chain (a), the bonding position of the nitrogen-containing n-membered ring compound which is bonded to the copolymer directly or through an organic group is not particularly limited, and may be any bonding position (position 1 to position n). Preferably, the bonding position is position 1 or position 3 to position n of the nitrogen-containing n-membered ring compound.

When the nitrogen-containing n-membered ring compound contains one nitrogen atom (for example, a pyridine ring or the like), position 3 to position (n−1) are preferable, because intramolecular chelate formation easily occurs, and the composition formed therefrom is excellent in physical properties such as tensile strength. By the selection of the bonding position of the nitrogen-containing n-membered ring compound, the elastomeric polymer tends to easily undergo cross-linking among molecules of the elastomeric polymer by hydrogen bonds, ionic bonding, coordinate bonds, or the like, and tends to be excellent in recyclability and excellent in mechanical properties, especially, tensile strength.

<Side Chain (b): Side Chain Containing Covalent-Bond Cross-Linking Moiety>

In the present description, the "side chain (b) containing a covalent-bond cross-linking moiety" means that a covalent-bond cross-linking moiety (a functional group or the like capable of forming at least one bond selected from the group consisting of amide, ester, lactone, urethane, ether, thiourethane, and thioether upon a reaction with "a compound that forms a covalent bond" such as an amino group-containing compound described later) is chemically stably bonded (covalently bonded) to an atom (generally, a carbon atom) forming the main chain of an elastomeric polymer. Here, the side chain (b) is one containing a covalent-bond cross-linking moiety. Note that when the side chain (b) further has a group capable of forming a hydrogen bond to form a cross-linkage by a hydrogen bond between side chains, while having the covalent-bonding moiety, such a side chain (b) is used as a side chain (c) described later (note that, when both a hydrogen donor and a hydrogen acceptor, which allow the formation of a hydrogen bond between side chains of the elastomer, are not contained, for example, when only a side chain simply containing an ester group (—COO—) is present in the system, such a group does not function as the hydrogen-bond cross-linkable moiety, because two ester groups (—COO—) do not form a hydrogen bond. Meanwhile, for example, when each side chain of the elastomer contains a structure having both a moiety serving as a hydrogen donor and a moiety serving as a hydrogen acceptor in a hydrogen bond, such as a carboxy group or a triazole ring, a hydrogen bond is formed between the side chains of the elastomer, and hence a hydrogen-bond cross-linkable moiety is considered to be contained. In addition, for example, when an ester group and a hydroxy group are coexistent in side chains of an elastomer, and these groups form a hydrogen bond between the side chains, the moiety forming the hydrogen bond serves as a hydrogen-bond cross-linkable moiety. For this reason, the side chain (b) may be used as the side chain (c) in some cases depending on the structure of the side chain (b) itself, the structure of the side chain (b) and the type of the substituent of another side chain, or the like). In addition, the "covalent-bond cross-linking moiety" used herein is a moiety which cross-links polymer molecules (elastomer molecules) to each other by a covalent bond.

The side chain (b) containing a covalent-bond cross-linking moiety is not particularly limited, and is preferably, for example, one containing a covalent-bond cross-linking moiety formed by a reaction of an elastomeric polymer having a functional group in a side chain (the polymer for forming a main chain portion) with a compound that forms a covalent-bond cross-linking moiety upon a reaction with the functional group (a compound that forms a covalent bond). The cross-linkage at the covalent-bond cross-linking moiety of the side chain (b) is preferably formed by at least one bond selected from the group consisting of amide, ester, lactone, urethane, ether, thiourethane, and thioether. For this reason, the functional group of the polymer constituting the main chain is preferably a functional group capable of forming at least one bond selected from the group consisting of amide, ester, lactone, urethane, ether, thiourethane, and thioether.

Examples of the "compound that forms a covalent-bond cross-linking moiety (the compound that forms a covalent bond)" include polyamine compounds having two or more amino and/or imino groups in one molecule (when both amino and imino groups are present, the total number of these groups is two or more); polyol compounds having two or more hydroxy groups in one molecule; polyisocyanate compounds having two or more isocyanate (NCO) groups in one molecule; polythiol compounds having two or more thiol groups (mercapto groups) in one molecule; and the like. The "compound that forms a covalent-bond cross-linking moiety (the compound that forms a covalent bond)" herein can be a compound capable of introducing both the hydrogen-bond cross-linkable moiety and the covalent-bond cross-linking moiety depending on the type of the substituent contained in the compound, the degree of the progress of a reaction in a case where the reaction is carried out by using such compound, or the like (for example, when a covalent bond cross-linking moiety is formed by using a compound having three or more hydroxy groups, two of the hydroxy groups react with a functional group of an elastomeric polymer having the functional group in side chains, and the remaining one hydroxy group is left as a hydroxy group in some cases depending on the degree of the progress of the reaction, and in this case, a moiety that can form a hydrogen-bond cross-linking can also be introduced). For this reason, "compounds that each form a covalent-bond cross-linking moiety (compounds that each forms a covalent bond)" listed as examples herein also include "compounds that each form both a hydrogen-bond cross-linkable moiety and a covalent-bond cross-linking moiety." From such a viewpoint, in the case of forming the side chain (b), the side chain (b) may be formed by selecting a compound from the "compounds that each form a covalent-bond cross-linking moiety (compounds that each form a covalent bond)" according to a target design, as appropriate, controlling the degree of the progress of the reaction, as appropriate, or doing the like. Note that when the compound that forms a covalent-bond cross-linking moiety has a heterocycle, it is possible to also simultaneously produce a hydrogen-bond cross-linkable moiety more efficiently, and it is possible to efficiently form a side chain having a covalent-bond cross-linking moiety as the side chain (c) described later. For this reason, specific examples of such compounds each having a heterocycle are described especially together with the side chain (c) as preferred compounds for producing the side chain (c). Note that because of its structure, the side chain (c) can also be regarded as a preferred mode of side chains such as the side chain (a) and the side chain (b).

Examples of the polyamine compound usable as the "compound that forms a covalent-bond cross-linking moiety (the compound that forms a covalent bond)" include alicyclic amines, aliphatic polyamines, aromatic polyamines, nitrogen-containing heterocyclic amines, and the like shown below.

Specific examples of the alicyclic amines include 1-amino-3-aminomethyl-3,5,5-trimethylcyclohexane, bis-(4-aminocyclohexyl)methane, diaminocyclohexane, di-(aminomethyl)cyclohexane, and the like.

In addition, examples of the aliphatic polyamines include, but are not particularly limited to, methylenediamine, ethylenediamine, propylenediamine, 1,2-diaminopropane, 1,3-diaminopentane, hexamethylenediamine, diaminoheptane, diaminododecane, diethylenetriamine, diethylaminopropylamine, N-aminoethylpiperazine, triethylenetetramine, N,N'-dimethylethylenediamine, N,N'-diethylethylenediamine, N,N'-diisopropylethylenediamine, N,N'-dimethyl-1,3-propanediamine, N,N'-diethyl-1,3-propanediamine, N,N'-diisopropyl-1,3-propanediamine, N,N'-dimethyl-1,6-hexanediamine, N,N'-diethyl-1,6-hexanediamine, N,N',N"-trimethylbis(hexamethylene) triamine, and the like.

Examples of the aromatic polyamines and the nitrogen-containing heterocyclic amines include, but are not particularly limited to, diaminotoluene, diaminoxylene, tetramethylxylylenediamine, tris(dimethylaminomethyl)phenol, m-phenylenediamine, diaminodiphenylmethane, diaminodiphenyl sulfone, 3-amino-1,2,4-triazole, and the like.

In addition, one or more hydrogen atoms in each of the polyamine compounds may be substituted by an alkyl group, an alkylene group, an aralkylene group, an oxy group, an acyl group, a halogen atom, or the like, or the skeleton of each polyamine compound may contain a heteroatom such as an oxygen atom or a sulfur atom.

In addition, one of the polyamine compounds may be used alone, or two or more thereof may be used in combination. When two or more thereof are used in combination, the mixing ratio can be adjusted to any ratio according to the application for which the thermoplastic elastomer (composition) of the present invention is used, or physical properties required for the thermoplastic elastomer (composition) of the present invention, and the like.

Among the polyamine compounds listed as examples above, hexamethylenediamine, N,N'-dimethyl-1,6-hexanediamine, diaminodiphenyl sulfone, and the like are preferable, because they provide high effects of improvement in compression set and mechanical strengths, especially, tensile strength.

The molecular weights or skeletons of the polyol compounds are not particularly limited, as long as the polyol compounds have two or more hydroxy groups. Examples of the polyol compounds include polyether polyols, polyester polyols, and other polyols shown below, mixed polyols thereof, and the like.

Specific examples of the polyether polyols include polyols each obtained by addition of at least one selected from ethylene oxide, propylene oxide, butylene oxide, and styrene oxide to at least one selected from polyols such as ethylene glycol, diethylene glycol, propylene glycol, dipropylene glycol, glycerin, 1,1,1-trimethylolpropane, 1,2,5-hexanetriol, 1,3-butanediol, 1,4-butanediol, 4,4'-dihydroxyphenylpropane, 4,4'-dihydroxyphenylmethane, and pentaerythritol; polyoxytetramethylene oxide; and the like. One of these polyether polyols may be used alone, or two or more thereof may be used in combination.

Specific examples of the polyester polyols include condensation polymers of one, two, or more low-molecular weight polyols such as ethylene glycol, propylene glycol, butanediol, pentanediol, hexanediol, cyclohexanedimethanol, glycerin, 1,1,1-trimethylolpropane, and others with one, two, or more low-molecular weight carboxylic acids or oligomeric acids such as glutaric acid, adipic acid, pimelic acid, suberic acid, sebacic acid, terephthalic acid, isophthalic acid, dimer acids, and others; ring-opening polymers of propiolactone, valerolactone, and the like; and the like. One of these polyester polyols may be used alone, or two or more thereof may be used in combination.

Specific examples of the other polyols include polymer polyols, polycarbonate polyols; polybutadiene polyols; hydrogenated polybutadiene polyols; acrylic polyols; low-molecular weight polyols such as ethylene glycol, diethylene glycol, propylene glycol, dipropylene glycol, butanediol, pentanediol, hexanediol, polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl)stearylamine), and polypropylene glycol stearylamine (for example, N,N-bis(2-methyl-2-hydroxyethyl)stearylamine); and the like. One of these polyols may be used alone, or two or more thereof may be used in combination.

Examples of the polyisocyanate compounds include diisocyanate compounds including aromatic polyisocyanates such as 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), tolidine diisocyanate (TODI), and 1,5-naphthalene diisocyanate (NDI), aliphatic polyisocyanates such as hexamethylene diisocyanate (HDI), trimethylhexamethylene diisocyanate (TMHDI), lysine diisocyanate, and norbornane diisocyanatomethyl (NBDI), alicyclic polyisocyanates such as trans-cyclohexane-1,4-diisocyanate, isophorone diisocyanate (IPDI), $H_6$XDI (hydrogenated XDI), (hydrogenated MDI), and $H_6$TDI (hydrogenated TDI), and the like; polyisocyanate compounds such as polymethylene polyphenylene polyisocyanate; carbodiimide-modified polyisocyanates of these isocyanate compounds; isocyanurate-modified polyisocyanate of these isocyanate compounds; urethane prepolymers obtained by reactions of these isocyanate compounds with the polyol compounds listed as examples above; and the like. One of these polyisocyanate compounds may be used alone, or two or more thereof may be used in combination.

The molecular weight, the skeleton, or the like of each of the polythiol compounds is not particularly limited, as long as the polythiol compounds have two or more thiol groups. Specific examples of the polythiol compounds include methanedithiol, 1,3-butanedithiol, 1,4-butanedithiol, 2,3-butanedithiol, 1,2-benzenedithiol, 1,3-benzenedithiol, 1,4-benzenedithiol, 1,10-decanedithiol, 1,2-ethanedithiol, 1,6-hexanedithiol, 1,9-nonanedithiol, 1,8-octanedithiol, 1,5-pentanedithiol, 1,2-propanedithiol, 1,3-propadithiol, toluene-3,4-dithiol, 3,6-dichloro-1,2-benzenedithiol, 1,5-naphthalenedithiol, 1,2-benzenedimethanethiol, 1,3-benzenedimethanethiol, 1,4-benzenedimethanethiol, 4,4'-thiobisbenzenethiol, 2,5-dimercapto-1,3,4-thiadiazole, 1,8-dimercapto-3,6-dioxaoctane, 1,5-dimercapto-3-thiapentane, 1,3,5-triazine-2,4,6-trithiol (trimercapto-triazine), 2-di-n-butylamino-4,6-dimercapto-s-triazine, trimethylolpropane tris(β-thiopropionate), trimethylolpropane tris(thioglycolate), polythiols (THIOKOL or thiol-modified polymers (resins, rubbers, and the like)), and the like. One of these polythiol compounds may be used alone, or two or more thereof may be used in combination.

A functional group which is contained in the polymer constituting the main chain, and which reacts with the "compound that forms a covalent-bond cross-linking moiety (compound that forms a covalent bond)" is preferably a functional group which can create (generate: form) at least one bond selected from the group consisting of amide, ester, lactone, urethane, thiourethane, and thioether. Preferred examples of such functional group include cyclic acid anhydride groups, hydroxy groups, amino groups, carboxy groups, isocyanate groups, thiol groups, and the like.

Note that the elastomeric polymer (B) having the side chain (b) has, in a portion of the side chain (b), at least one cross-linkage at the covalent-bond cross-linking moiety, specifically, at least one cross-linkage by a covalent bond formed by a reaction of the functional group with the above-described "compound that forms a covalent-bond cross-linking moiety (compound that forms a covalent bond)" in one molecule. Particularly when the cross-linking is formed by at least one bond selected from the group consisting of lactone, urethane, ether, thiourethane, and thioether, the elastomeric polymer (B) preferably has two or more cross-linkages, more preferably 2 to 20 cross-linkages, and further preferably 2 to 10 cross-linkages.

In addition, the cross-linkage at the covalent-bond cross-linking moiety of the side chain (b) preferably contains a tertiary amino bond (—N═) or an ester bond (—COO—), because the compression set and the mechanical strengths (elongation at break and strength at break) of the obtained thermoplastic elastomer (composition) can be improved more easily. Note that, in this case, when an elastomer having a side chain containing a group capable of forming a hydrogen bond with the tertiary amino bond (—N═) or the ester bond (—COO—) is contained (for example, in a case where another elastomer having a side chain containing a hydroxy group or the like is present, or other cases), the covalent-bond cross-linking moiety can function as a side chain (c) described later. For example, in a case of an elastomeric polymer (B) having the side chain (a) as the side chain (a') (i.e., in a case where the elastomeric polymer (B)

is an elastomeric polymer having both the side chains (a) and (b)), when the cross-linkage at the covalent-bond cross-linking moiety has the tertiary amino bond and/or the ester bond, these groups and groups in the side chain (a) (side chain having a carbonyl-containing group and/or a nitrogen-containing heterocycle) presumably form hydrogen bonds (interact with each other), making it possible to further improve the cross-linking density. Note that from the viewpoint of forming the side chain (b) having a structure containing a tertiary amino bond (—N═) or an ester bond (—COO—), the "compound that forms a covalent-bond cross-linking moiety (compound that forms a covalent bond)" is preferably polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl) stearylamine), or polypropylene glycol stearylamine (for example, N,N-bis(2-methyl-2-hydroxyethyl)stearylamine), among those listed as examples above.

Note that even when the above-described compound that forms a covalent-bond cross-linking moiety (compound that forms a covalent bond) is used, a hydrogen-bond cross-linkable moiety is also introduced in some cases, depending on the degree of the progress of the reaction, the type of substituent, the stoichiometric ratio of the raw materials used, and the like. Hence, preferred structures of the covalent-bond cross-linking moiety are described together with preferred structures of a covalent-bond cross-linking moiety in the side chain (c).

<Side Chain (c): Side Chain Containing Both Hydrogen-Bond Cross-Linkable Moiety and Covalent-Bond Cross-Linking Moiety>

The side chain (c) contains both a hydrogen-bond cross-linkable moiety and a covalent-bond cross-linking moiety in a single side chain. The hydrogen-bond cross-linkable moiety contained in the side chain (c) is the same as the hydrogen-bond cross-linkable moiety described for the side chain (a'), and preferred ones thereof are the same as those for the hydrogen-bond cross-linkable moiety in the side chain (a). In addition, as the covalent-bond cross-linking moiety contained in the side chain (c), the same covalent-bond cross-linking moiety as that in the side chain (b) can be used (the same cross-linkages can be used as preferred cross-linkage thereof).

The side chain (c) is preferably one formed by a reaction of an elastomeric polymer having a functional group in a side chain (the polymer for forming a main chain portion) with a compound that forms both a hydrogen-bond cross-linkable moiety and a covalent-bond cross-linking moiety upon a reaction with the functional group (a compound that introduces both a hydrogen-bond cross-linkable moiety and a covalent-bond cross-linking moiety). The compound that forms both a hydrogen-bond cross-linkable moiety and a covalent-bond cross-linking moiety (compound that introduces both a hydrogen-bond cross-linkable moiety and a covalent-bond cross-linking moiety) is preferably a compound that has a heterocycle (particularly preferably a nitrogen-containing heterocycle) and is capable of forming a covalent-bond cross-linking moiety (a compound that forms a covalent bond), and, especially, the compound is more preferably a heterocycle-containing polyol, a heterocycle-containing polyamine, a heterocycle-containing polythiol, or the like.

Note that, as the heterocycle-containing polyols, polyamines, and polythiols, it is possible to use, as appropriate, the same polyols, polyamines, and polythiols described for the above-described "compound capable of forming a covalent-bond cross-linking moiety (compound that forms a covalent bond)," except that a heterocycle (particularly preferably a nitrogen-containing heterocycle) is present. In addition, examples of the heterocycle-containing polyols include, but are not particularly limited to, bis or tris(2-hydroxyethyl) isocyanurate, Kojic acid, dihydroxydithiane, and tris(hydroxyethyl)triazine. Meanwhile, examples of the heterocycle-containing polyamines include, but are not particularly limited to, acetoguanamine, piperazine, bis (aminopropyl) piperazine, benzoguanamine, and melamine. Moreover, examples of the heterocycle-containing polythiols include dimercaptothiadiazole, and tris-[(3-mercaptopropionyloxy)-ethyl] isocyanurate. Accordingly, the side chain (c) is preferably one obtained by a reaction of an elastomeric polymer having a functional group in a side chain (the polymer for forming a main chain portion) with a heterocyclic-containing polyol, polyamine, or polythiol, or the like.

Note that the functional group of the polymer constituting a main chain that reacts with the "compound that forms both a hydrogen-bond cross-linkable moiety and a covalent-bond cross-linking moiety (the compound that introduces both a hydrogen-bond cross-linkable moiety and a covalent-bond cross-linking moiety)" is preferably a functional group capable of forming at least one bond selected from the group consisting of amide, ester, lactone, urethane, thiourethane, and thioether. Preferred examples of such a functional group include a cyclic acid anhydride group, a hydroxy group, an amino group, a carboxy group, an isocyanate group, a thiol group, and the like.

In addition, the elastomeric polymer (B) having the side chain (c) has at least one cross-linkage at the covalent-bond cross-linking moiety in a portion of the side chain (c) in one molecule. Especially when the cross-linking is formed by at least one bond selected from the group consisting of lactone, urethane, ether, thiourethane, and thioether, the elastomeric polymer (B) has preferably two or more cross-linkages, more preferably 2 to 20 cross-linkages, and further preferably 2 to 10 cross-linkages. In addition it is preferable that the cross-linkage at the covalent-bond cross-linking moiety of the side chain (c) contain a tertiary amino bond (—N═) or an ester bond (—COO—), because the compression set and the mechanical strengths (elongation at break and strength at break) of the obtained thermoplastic elastomer (composition) are further improved.

(Regarding Structures Preferred as Covalent-Bond Cross-Linking Moieties in Side Chains (b) and (c))

Regarding the side chains (b) and/or (c), suppose a case where the cross-linkage at the covalent-bond cross-linking moiety contains a tertiary amino bond (—N═) or an ester bond (—COO—), and the binding site of such a bond also functions as a hydrogen-bond cross-linkable moiety. Such a case is preferable because the compression set and the mechanical strengths (elongation at break and strength at break) of the obtained thermoplastic elastomer (composition) are improved to higher levels. When a tertiary amino bond (—N═) or an ester bond (—COO—) in a side chain having a covalent-bond cross-linking moiety forms a hydrogen bond with another side chain as described above, the covalent-bond cross-linking moiety containing a tertiary amino bond (—N═) or an ester bond (—COO—) also comprises a hydrogen-bond cross-linkable moiety, and can function as the side chain (c).

Suppose, for example, a case where the elastomeric polymer (B) has the side chain (a) as the side chain (a'), and has a covalent-bond cross-linking moiety containing the tertiary amino bond and/or the ester bond. In such a case, when the tertiary amino bond and/or the ester bond forms a hydrogen bond (interacts) with a group in the side chain (a), the cross-linking density can be further improved, presumably. Here, preferred examples of the compound that can form a covalent-bond cross-linking moiety containing the tertiary amino bond and/or the ester bond upon a reaction with a functional group of the polymer constituting a main chain (compound capable of forming both a hydrogen-bond cross-linkable moiety and a covalent-bond cross-linking moiety) include polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl)stearylamine), and polypropylene glycol stearylamine (for example, N,N-bis(2-methyl-2-hydroxyethyl)stearylamine).

The above-described cross-linkage at the covalent-bond cross-linking moiety in the side chain (b) and/or the side chain (c) is preferably one containing at least one structure represented by anyone of the following general formulae (4) to (6), and is more preferably one in which G in the formulae contains a tertiary amino bond or an ester bond (note that when a structure shown below contains a hydrogen-bond cross-linkable moiety, the side chain having the structure is used as a side chain (c)).

[Chem. 9]

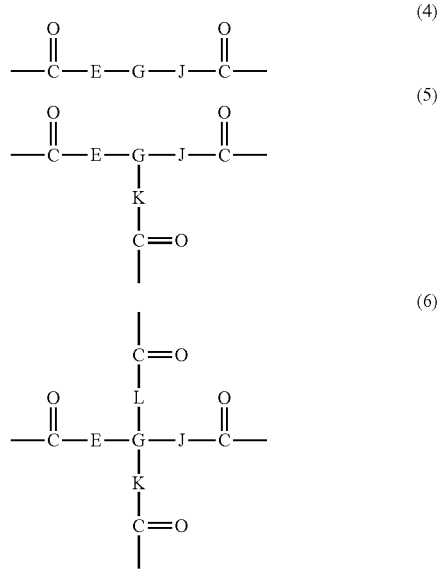

In the above-described general formulae (4) to (6), E, J, K, and L are each independently a single bond; an oxygen atom, an amino group NR' (where R' is a hydrogen atom or an alkyl group having 1 to 10 carbon atoms), or a sulfur atom; or an organic group optionally containing any of the atoms or groups, and G is a linear-chain, branched-chain, or cyclic hydrocarbon group having 1 to 20 carbon atoms and optionally containing an oxygen atom, a sulfur atom, or a nitrogen atom.

Here, the substituents E, J, K, and L are each independently basically the same as the substituent B in the above-described general formula (1).

In addition, examples of the substituent G include alkylene groups such as a methylene group, an ethylene group, a 1,3-propylene group, a 1,4-butylene group, a 1,5-pentylene group, a 1,6-hexylene group, a 1,7-heptylene group, a 1,8-octylene group, a 1,9-nonylene group, a 1,10-decylene group, a 1,11-undecylene group, and a 1,12-dodecylene group; N,N-diethyldodecylamine-2,2'-diyl, N,N-dipropyldodecylamine-2,2'-diyl, N,N-diethyloctylamine-2,2'-diyl, N,N-dipropyloctylamine-2,2'-diyl, N,N-diethylstearylamine-2,2'-diyl, and N,N-dipropylstearylamine-2,2'-diyl; a vinylene group; divalent alicyclic hydrocarbon groups such as a 1,4-cyclohexlene group; divalent aromatic hydrocarbon groups such as a 1,4-phenylene group, a 1,2-phenylene group, a 1,3-phenylene group, and a 1,3-phenylenebis(methylene) group; trivalent hydrocarbon groups such as propane-1,2,3-triyl, butane-1,3,4-triyl, trimethylamine-1,1',1"-triyl, and triethylamine-2,2',2"-triyl; trivalent cyclic hydrocarbons containing an oxygen atom, a sulfur atom, or a nitrogen atom such as an isocyanurate group and a triazine group; tetravalent hydrocarbon groups represented by the following formulae (12) and (13); substituents formed by combining any ones of them; and the like. In addition, the substituents G in these formulae each preferably have a structure of an isocyanurate group (isocyanurate ring) from the viewpoints of achieving high heat resistance and high strength thanks to hydrogen bonds. More specifically, the substituents G in these formulas are preferably groups represented by the following general formula (111) and groups represented by the following general formula (112) from the viewpoints of achieving high heat resistance and high strength thanks to hydrogen bonds.

[Chem. 10]

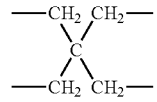

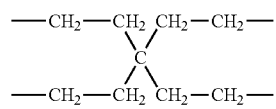

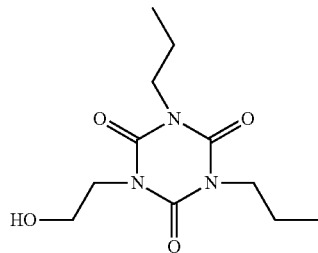

-continued (112)

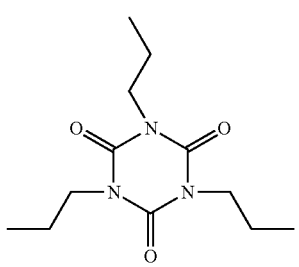

Moreover, the above-described cross-linkage at the covalent-bond cross-linking moiety of the side chain (c) preferably contains at least one structure represented by any one of the following formulae (7) to (9), which is bonded to the main chain of the above-described elastomeric polymer at the α position or the β position, and more preferably contains at least one structure represented by any one of the following formulae (7) to (9), in which G contains a tertiary amino group (the structures shown in the formulae (7) to (9) contain hydroxy groups and carbonyl groups, and can be considered as structures containing both a hydrogen-bond cross-linkable moiety and a covalent-bond cross-linking moiety, and a side chain having such a structure can function as the side chain (c)).

[Chem. 11]

(7)

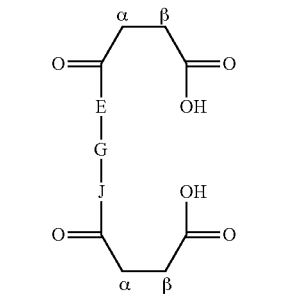

(8)

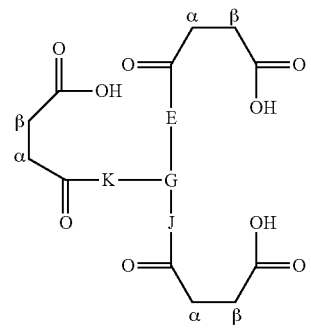

-continued (9)

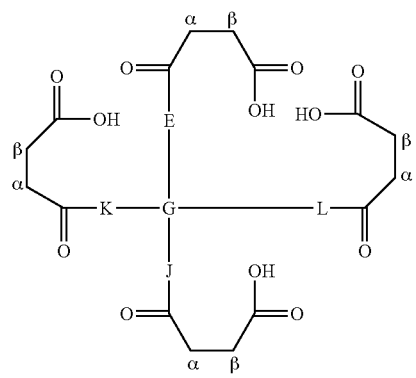

In the formulae (7) to (9), the substituents E, J, K, and L are each independently basically the same as the substituents E, J, K, and L in the above-described formulae (4) to (6), and the substituent G is basically the same as the substituent G in the above-described formula (4).

In addition, specific preferred examples of the structure represented by any one of the formulae (7) to (9) include compounds represented by the following formula (14) to (25):

[Chem. 12]

(14)

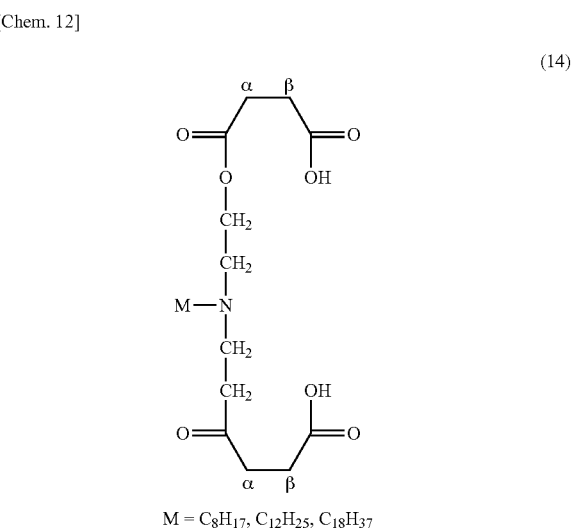

M = $C_8H_{17}$, $C_{12}H_{25}$, $C_{18}H_{37}$ (15)

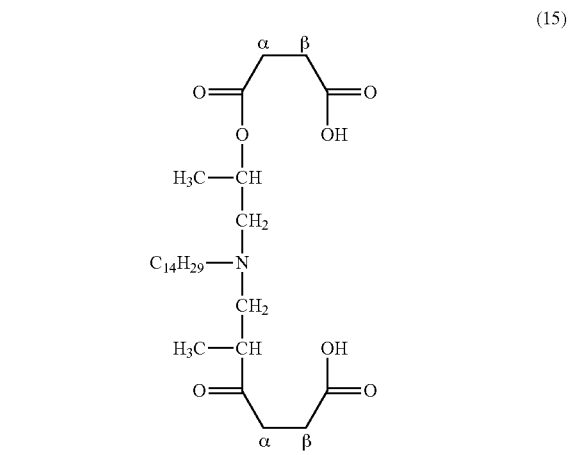

(16)
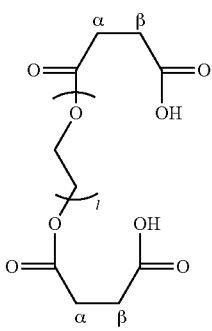
(17)
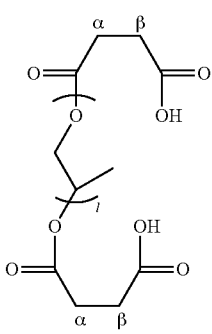
(In the formulae, l represents an integer of 1 or greater.)
[Chem. 13]
(18)
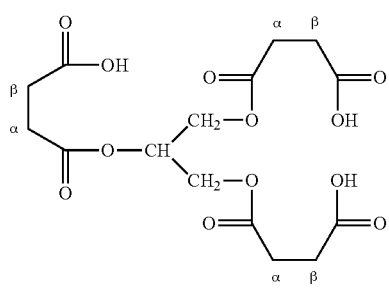
(19)
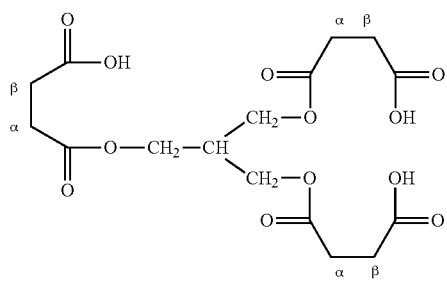
(20)
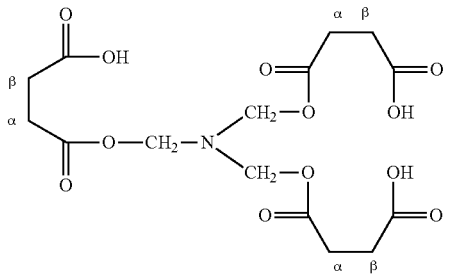
(21)
[Chem. 14]
(22)
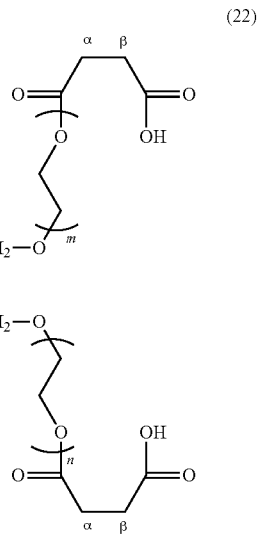

(23)

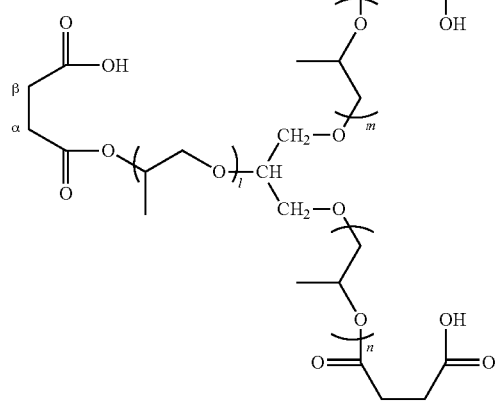

(In the formulae, l, m, and n each independently represent an integer of 1 or greater.)

[Chem. 15]

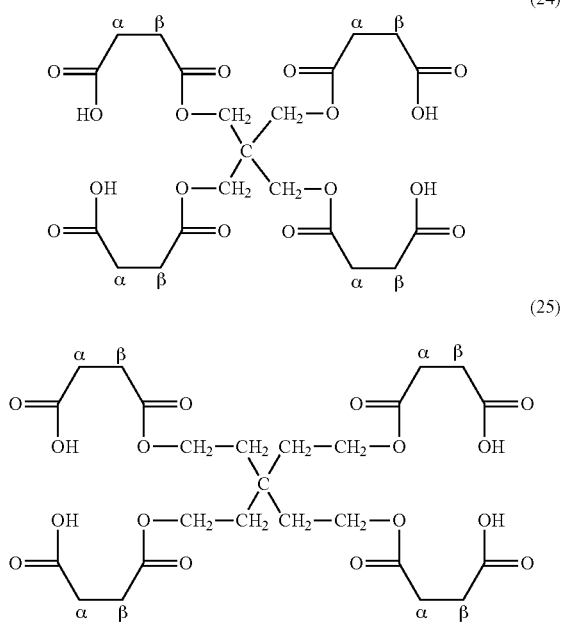

(24)

(25)

In addition, a cross-linkage at the above-described covalent-bond cross-linking moiety in each of the side chains (b) and (c) is preferably formed by a reaction of a cyclic acid anhydride group with a hydroxy group or an amino group and/or an imino group. For example, when a polymer forming a main chain portion after the reaction has a cyclic acid anhydride group (for example, a maleic anhydride group) as a functional group, the cross-linkage may be formed by a reaction of the cyclic acid anhydride group of the polymer with the compound that forms a covalent-bond cross-linking moiety having a hydroxy group or an amino group and/or an imino group (compound that forms a covalent bond), to form a moiety cross-linked by the covalent bond, thereby cross-linking polymer molecules.

The cross-linkage at the covalent-bond cross-linking moiety of each of the side chains (b) and (c) is more preferably formed by at least one bond selected from the group consisting of amide, ester, lactone, urethane, ether, thiourethane, and thioether.

Hereinabove, the side chain (a'), the side chain (a), the side chain (b), and the side chain (c) are described. The groups (structures) and the like of the side chains in the polymers can be identified by ordinarily used analytic techniques such as NMR and IR spectrometry.

In addition, the elastomeric polymer (A) is an elastomeric polymer having the side chain (a) and having a glass-transition point of 25° C. or below, whereas the elastomeric polymer (B) is an elastomeric polymer containing a hydrogen-bond cross-linkable moiety and a covalent-bond cross-linking moiety in a side chain and having a glass-transition point of 25° C. or below (a polymer having both the side chain (a') and the side chain (b) as side chains, or a polymer containing at least one side chain (c) in a side chain, or the like). As the elastomer component, one of the elastomeric polymers (A) and (B) may be used alone, or a mixture of two or more thereof may be used.

Note that the elastomeric polymer (B) may be either a polymer having both a side chain (a') and a side chain (b), or a polymer having a side chain (c). From the viewpoint that a stronger hydrogen bond is formed, the hydrogen-bond cross-linkable moiety contained in the side chain of the elastomeric polymer (B) is preferably a hydrogen-bond cross-linkable moiety having a carbonyl-containing group and/or a nitrogen-containing heterocycle (more preferably a hydrogen-bond cross-linkable moiety having a carbonyl-containing group and a nitrogen-containing heterocycle).

A method for producing such an elastomeric polymer (A) or (B) is not particularly limited, and a known method can be employed, as appropriate, by which at least one selected from the group consisting of the side chain (a); the side chain (a') with the side chain (b); and the side chain (c) as described above can be introduced as a side chain of an elastomeric polymer having a glass-transition point of 25° C. or below. For example, as the method for producing the elastomeric polymer (B), it is also possible to employ a method described in Japanese Unexamined Patent Application Publication No. 2006-131663. In addition, to obtain the elastomeric polymer (B) comprising the side chain (a') and the side chain (b) as described above, for example, these side chains may be simultaneously introduced to an elastomeric polymer having a cyclic acid anhydride group (for example, a maleic anhydride group) serving as a functional group in a side chain by using a mixture (mixed raw material) of a compound that forms a covalent-bond cross-linking moiety upon a reaction with the cyclic acid anhydride group (a compound that forms a covalent bond) and a compound that forms a hydrogen-bond cross-linkable moiety upon a reaction with the cyclic acid anhydride group (a compound capable of introducing a nitrogen-containing heterocycle).

In addition, as a method for producing the elastomeric polymers (A) and (B), it is possible to employ, for example, a method in which an elastomeric polymer having a functional group (for example, a cyclic acid anhydride group or the like) in a side chain is used, and the elastomeric polymer is reacted with at least one raw material compound of a compound that forms a hydrogen-bond cross-linkable moiety upon a reaction with the functional group, and a mixed raw material of a compound that forms a hydrogen-bond cross-linkable moiety upon a reaction with the functional group and a compound that forms a covalent-bond cross-linking moiety upon a reaction with the functional group, to produce an elastomeric polymer having the side chain (a); an elastomeric polymer having the side chain (a') with the side chain (b); and/or an elastomeric polymer having the side chain (c) (the elastomeric polymers (A) and (B)). Note that conditions (temperature condition, atmosphere conditions, or the like) employed for the reaction are not particularly limited, and may be set, as appropriate, according to the types of the functional group and the compound to be reacted with the functional group (compound that forms a hydrogen-bond cross-linkable moiety and/or a compound that forms a covalent-bond cross-linking moiety). Note that the elastomeric polymer (A) may also be produced by polymerization of a monomer having a hydrogen bonding moiety.

The elastomeric polymer having such a functional group (for example, a cyclic acid anhydride group) in a side chain is preferably a polymer that can form a main chain of the above-described elastomeric polymers (A) and (B) and having a functional group in a side chain. Here, the "elastomeric polymer containing a functional group in a side chain" refers to an elastomeric polymer having a functional group (the above-described functional group or the like, for example, a cyclic acid anhydride group or the like) chemically stably bonded (covalently bonded) to an atom forming a main chain, and it is possible to preferably use one obtained by a reaction of an elastomeric polymer (for example, a known natural polymer or synthetic polymer) with a compound capable of introducing a functional group.

In addition, the functional group is preferably a functional group capable of forming at least one bond selected from the group consisting of amide, ester, lactone, urethane, ether, thiourethane, and thioether, among which a cyclic acid anhydride group, a hydroxy group, an amino group, a carboxy group, an isocyanate group, a thiol group, or the like is preferable. The functional group is particularly preferably a cyclic acid anhydride group, from the viewpoint that the clay can be dispersed more efficiently in the composition. In addition, the cyclic acid anhydride group is preferably a succinic anhydride group, a maleic anhydride group, a glutaric anhydride group, or a phthalic anhydride group. Especially, a maleic anhydride group is more preferable, from the viewpoint that it can be easily introduced to a side chain of a polymer and can be easily obtained industrially. In addition, when the functional group is a cyclic acid anhydride group, the functional group may be introduced to the elastomeric polymer (for example, a known natural polymer or synthetic polymer) by using, for example, a cyclic acid anhydride such as succinic anhydride, maleic anhydride, glutaric anhydride, phthalic anhydride, and an derivative thereof, as a compound enabling the introduction of the functional group.

Note that the compound that forms a hydrogen-bond cross-linkable moiety upon a reaction with the functional group is not particularly limited, and it is preferable to use the above-described "compound that forms a hydrogen-bond cross-linkable moiety (a compound capable of introducing a nitrogen-containing heterocycle)." In addition, the compound that forms a covalent-bond cross-linking moiety upon a reaction with the functional group is not particularly limited, and it is preferable to use the above-described "compound that forms a covalent-bond cross-linking moiety (compound that forms a covalent bond)." Moreover, as the compound that forms a hydrogen-bond cross-linkable moiety (a compound capable of introducing a nitrogen-containing heterocycle) and the compound that forms a covalent-bond cross-linking moiety (a compound that forms a covalent bond), a compound that forms both a hydrogen-bond cross-linkable moiety and a covalent-bond cross-linking moiety upon a reaction with the functional group (for example, a polyol, polyamine, or polythiol containing a nitrogen-containing heterocycle, or the like) can also be used preferably.

In addition, when a method in which an elastomeric polymer having a side chain in a functional group (for example, cyclic acid anhydride group) is used, and the elastomeric polymer is reacted with at least one raw material compound of a compound that forms a hydrogen-bond cross-linkable moiety upon a reaction with the functional group, and a mixed raw material of a compound that forms a hydrogen-bond cross-linkable moiety upon a reaction with the functional group and a compound that forms a covalent-bond cross-linking moiety upon a reaction with the functional group, to produce the elastomeric polymer (A) having the side chain (a), or the elastomeric polymer (B) containing a hydrogen-bond cross-linkable moiety and a covalent-bond cross-linking moiety in a side chain is employed as a method for producing an elastomer component (elastomeric polymers (A) and (B)), it is possible to employ a method in which, before the reaction of the elastomeric polymer having a functional group in a side chain with the raw material compound, an clay is mixed with the elastomeric polymer having a functional group in a side chain, and then the raw material compound is added, followed by a reaction, to form the composition simultaneously with the preparation of the elastomer component (a method in which a clay is added first).

Note that it is preferable to prepare the composition simultaneously with the preparation of the elastomer component by employing the above-described method in which the clay is added first at the time of the production of the elastomer components (elastomeric polymers (A) and (B)) because the dispersibility of the clay is further improved to lead to a higher level of heat resistance.

In addition, the at least one elastomer component selected from the group consisting of the elastomeric polymers (A) and (B) is preferably at least one selected from the group consisting of reaction products of a maleic anhydride-modified elastomeric polymer with at least one compound (hereinafter, simply referred to as "compound (X)" in some cases) among triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurates, sulfamides, and polyether polyols from the viewpoints that the elastomer component can easily be obtained industrially and further can have high levels of mechanical strength and resistance to compression set in a well-balanced manner. As described above, the elastomeric polymers (A) and (B) are each preferably a reaction product of the maleic anhydride-modified elastomeric polymer with the compound (X).

(Clay)

The clay according to the present invention is not particularly limited, and any publicly known clay (such as clay mineral) can be used. As such a clay, there are naturally occurring clays, synthetic clays, and organically modified clays. Examples thereof include montmorillonite, saponite, hectorite, beidellite, stevensite, nontronite, vermiculite, halloysite, mica, fluorinated mica, kaolinite, pyrophyllite, smectite, sericite, illite, glauconite, chlorite, talc, zeolite, hydrotalcite, and the like.

Of these clays, at least one selected from the group consisting of clays mainly containing silicon and magnesium, and organically modified clays is preferable.

In addition, in the present invention, a clay mainly containing silicon and magnesium refers to a clay in which main components of metals in metal oxides serving as components of the clay are silicon (Si) and magnesium (Mg), and may contain other metal oxides (aluminum (Al), iron (Fe), and the like) as sub components. The clay mainly containing silicon and magnesium is not particularly limited, and a known one can be used, as appropriate. Because of its small particle diameter, the use of a clay mainly containing silicon and magnesium makes it possible to increase reinforcing properties. In addition, the clay mainly containing silicon and magnesium is preferably a clay having a smectite structure, from the viewpoint of the availability.

In addition, examples of the clay mainly containing silicon and magnesium include stevensite, hectorite, saponite, talc, and the like, among which stevensite, hectorite, or saponite is more preferably used from the viewpoint of the dispersibility.

In addition, the clay mainly containing silicon and magnesium is preferably a synthetic clay. As the synthetic clay, a commercially available one can also be used, and, for example, it is possible to use, as appropriate, one manufactured by KUNIMINE INDUSTRIES CO., LTD. under the trade name of "Sumecton SA" or "Sumecton ST," manufactured by Mizusawa Industrial Chemicals, Ltd. under the trade name of "IONITE," or manufactured by Co-Op Chemical Co., Ltd. under the trade name of "Lucentite," or the like.

In addition, the organically modified clay is preferably, but not particularly limited to, one formed by organically modifying a clay with an organically modifying agent. The clay before the organic modification is not particularly limited, and may be any so-called clay mineral. Examples thereof include montmorillonite, saponite, hectorite, beidellite, stevensite, nontronite, vermiculite, halloysite, mica, fluorinated mica, kaolinite, pyrophyllite, smectite, sericite, illite, glauconite, chlorite, talc, zeolite, hydrotalcite, and the like. In addition, the clay may be a natural product or a synthetic product.

In addition, the organically modifying agent is not particularly limited, and a known organically modifying agent capable of organically modifying a clay can be used, as appropriate. For example, it is possible to use hexylammonium ions, octylammonium ions, 2-ethylhexylammonium ions, dodecylammonium ions, laurylammonium ions, octadecylammonium ions, dioctyldimethylammonium ions, trioctylammonium ions, dioctadecyldimethylammonium ions, trioctylammonium ions, dioctadecyldimethylammonium ions, trioctadecylammonium ions, or the like.

In addition, from the viewpoint of single-layer dispersibility, a quaternary ammonium salt of a clay can be used preferably as the organically modified clay. Examples of the quaternary ammonium salt of the organically modified clay which can be preferably used include, but are not particularly limited to, trimethylstearylammonium salts, salts of oleylbis(2-hydroxylethyl), methylammonium salts, dimethylstearylbenzylammonium salts, dimethyloctadecylammonium salts, and mixtures of two or more thereof. Note that as the quaternary ammonium salt of an organically modified clay, a dimethylstearylbenzylammonium salt, a dimethyloctadecylammonium salt, or a mixture thereof can be used more preferably, and a mixture of a dimethylstearylbenzylammonium salt and a dimethyloctadecylammonium salt can be used further preferably, from the viewpoint of improvement in tensile strength and heat resistance.

In addition, a commercially available one can be used as the organically modified clay, and, for example, those manufactured by KUNIMINE INDUSTRIES CO., LTD. under the trade name of "Kunfil-D36," "Kunfil-B1," "Kunfil-HY," and the like, as well as those manufactured by HOJUN Co., Ltd. under the trade name of "S-BEN series (C, E, W, WX, N-400, NX, NX80, NZ, NZ70, NE, NEZ, NO12S, and NO12," and "ORGANITE series (D, T), and the like, can be used, as appropriate. Among the commercially available organically modified clays, those manufactured by KUNIMINE INDUSTRIES CO., LTD. under the trade name of "Kunfil-D36" and manufactured by HOJUN Co., Ltd. under the trade name of "S-BEN series WX" can be used preferably.

As described above, the clay according to the present invention is preferably a clay mainly containing silicon and magnesium or an organically modified clay from the viewpoint of high dispersibility, and especially, an organically modified clay is particularly preferably used, because a higher level of tensile stress (modulus) can be obtained.

(Paraffin Oil)

The paraffin oil according to the present invention is not particularly limited, and any publicly known paraffin oil can be used as appropriate.

Then, when such a paraffin oil is measured by correlation ring analysis (n-d-M ring analysis) according to ASTM D3238-85 to obtain a percentage of the number of paraffin's carbon atoms to the total number of carbon atoms (paraffin part: $C_P$), a percentage of the number of naphthene's carbon atoms to the total number of carbon atoms (naphthene part: $C_N$), and a percentage of the number of aromatic carbon atoms to the total number of carbon atoms (aromatic part: $C_A$), it is preferable that the paraffin oil have 60% or more as the percentage ($C_P$) of the number of paraffin's carbon atoms to the total number of carbon atoms.

Moreover, in the conductive thermoplastic elastomer composition of the present invention, the paraffin oil is one having a kinematic viscosity at 40° C. measured according to JIS K 2283 (published in 2000) of preferably 10 mm$^2$/s to 700 mm$^2$/s, more preferably 20 to 600 mm$^2$/s, and further preferably 30 to 500 mm$^2$/s. If the kinematic viscosity (v) is less than the lower limit, oil bleeding tends to occur. Meanwhile, if the kinematic viscosity (v) exceeds the upper limit, sufficient flowability tends not to be imparted. As the kinematic viscosity of the paraffin oil, a value is employed which is measured under a temperature condition of 40° C. according to JIS K 2283 (published in 2000). For example, a value may be employed which is automatically measured under a temperature condition of 40° C. by using a Cannon-Fenske Viscometer (for example, one manufactured by SIBATA SCIENTIFIC TECHNOLOGY LTD. under the trade name "SO series") according to JIS K 2283 (published in 2000).

Further, in the conductive thermoplastic elastomer composition of the present invention, the paraffin oil has an aniline point measured by a U-tube method according to JIS K 2256 (published in 2013) of preferably 80° C. to 145° C., more preferably 100 to 145° C., and further preferably 105 to 145° C. As the aniline point of the paraffin oil, a value is employed which is measured by the U-tube method according to JIS K 2256 (published in 2013). For example, a value may be employed which is measured by using, for example, an aniline point tester (for example, one manufactured by Tanaka Scientific Limited. under the trade name "aap-6") according to JIS K 2256 (published in 2013).

As the paraffin oil, any commercially available paraffin oil can be used as appropriate. Examples thereof usable as appropriate include oils manufactured by JX Nippon Oil & Energy Corporation under the trade names of "Super Oil M Series", "Super Oil N Series" (P200, P400, P500S, and the like), and 300HV-S(J); oils manufactured by Idemitsu Kosan Co., Ltd. under the trade names of "Diana Process Oil PW90", "Diana Process Oil PW150", and "Diana Process Oil PW380"; oils manufactured by JAPAN SUN OIL COMPANY, LTD. under the trade names of "SUNPAR series" (110, 115, 120, 130, 150, 2100, 2280, and so on); oils manufactured by Exxon Mobil Corporation under the trade names of "Gargoyle Arctic series (1010, 1022, 1032, 1046, 1068, 1100, and so on)" and the like.

(Carbon-Based Filler)

The carbon-based filler according to the present invention has a BET specific surface area of 50 $m^2/g$ or more. When such a BET specific surface area is less than 50 $m^2/g$, it is impossible to obtain a sufficiently high level of conductivity. In addition, since it is possible to obtain a higher level of conductivity, such a BET specific surface area of the carbon-based filler is more preferably 100 $m^2/g$ or more, further preferably 200 $m^2/g$ or more, particularly preferably 300 $m^2/g$ or more, and moreover most preferably 500 $m^2/g$ or more. Note that, although the upper limit value of the BET specific surface area is not particularly limited, the BET specific surface area of the carbon-based filler is preferably 2500 $m^2/g$ or less and more preferably 2000 $m^2/g$ or less from the viewpoints of making it possible to more easily mix the carbon-based filler in the composition and improving the workability during the production of the composition. Note that, as the BET specific surface area of the carbon-based filler, it is possible to employ a value measured by the single point BET method involving a gas adsorption method using nitrogen gas (nitrogen gas adsorption method) in accordance with DIN 66132. Note that, as mentioned above, the conductive thermoplastic elastomer composition of the present invention contains a carbon-based filler having a BET specific surface area of 50 $m^2/g$ or more. Here, various components as a filler have been used in compositions having a conventional elastomer as a substrate, and it has been thought that use of a filler having a large specific surface area makes it impossible to obtain a sufficient effect even when the filler is mixed in the elastomer to add the components thereof due to various reasons such as dispersibility. Therefore, it has conventionally been common to use a filler having a sufficiently small specific surface area. As described above, it has been a conventional practice that fillers having such a relatively large specific surface area that the BET specific surface area is 50 $m^2/g$ or more are not used for reinforcing agents and the like for elastomer compositions. In contrast, the present inventors have found a surprising fact that, by using a carbon-based filler having such a relatively large specific surface area that the BET specific surface area is 50 $m^2/g$ or more together with the specific elastomer component, the clay in a specific amount, and the paraffin oil in a specific amount, the obtained composition can be imparted with a sufficiently high level of conductivity and a sufficiently high level of resistance to compression set in a well-balanced manner. Here, the findings of the present inventors are as follows. When the carbon-based filler is simply contained, it is difficult to maintain the resistance to compression set at a sufficiently high level as obtained in the present application. However, use of the carbon-based filler in combination with the paraffin oil in a specific amount makes it possible to achieve a sufficiently high level of resistance to compression set. This makes it possible to achieve sufficiently high levels of conductivity and resistance to compression set. Additionally, the present invention makes it possible to provide a conductive material which is resistant to plastic deformation due to external stress.

Examples of such a carbon-based filler include carbon blacks, carbon nanotubes, carbon fibers, and graphemes. As carbon blacks, carbon nanotubes, carbon fibers, graphemes, and the like usable as such a carbon-based filler, any publicly known ones (such as commercially available products) can be used as appropriate as long as they have a BET specific surface area of 50 $m^2/g$ or more. Among these carbon-based fillers, carbon blacks and carbon nanotubes are more preferable from the viewpoint that it is possible to reduce cost by decreasing the amount contained. Note that the carbon-based fillers can be used singly or in combination of two or more kinds.

Examples of the carbon blacks which can be preferably used as the carbon-based filler include Ketjen black, furnace black, channel black, acetylene black, and arc black. These carbon blacks can be used singly or in combination of two or more kinds.

The average primary particle diameter of those carbon blacks is preferably 10 to 700 nm and more preferably 20 to 100 nm. If the average primary particle diameter is less than the lower limit, the fineness is so small that it tends to be difficult to achieve sufficient dispersion and it tends to be difficult to strike a sufficiently high level of balance of physical properties. Meanwhile, if the average primary particle diameter exceeds the upper limit, there is a concern that the particle diameter could produce a starting point of destruction when an external force is applied, which may tend to cause a deterioration in tensile properties and the like in some cases.

As such carbon blacks, commercially available products can be used as appropriate. For example, as commercially available products of the carbon-based filler, KETJENBLACK EC300J and EC600JD (manufactured by Lion Specialty Chemicals Co., Ltd.), TOKABLACK #4400, #4500, and #5500 (manufactured by Tokai Carbon Co., Ltd.), MITSUBISHI Conductive Carbon Black (manufactured by Mitsubishi Chemical Corporation), and the like can be used as appropriate.

Moreover, examples of the carbon nanotubes which can be preferably used as the carbon-based filler include single-layered carbon nanotubes and multi-layered carbon nanotubes. Those carbon nanotubes are preferably single-layered carbon nanotubes from the viewpoint that it is possible to express higher physical properties.

The carbon nanotubes are preferably ones having an average diameter of 0.1 to 120 nm (more preferably 0.4 to 100 nm). If the diameter is less than the lower limit, the fineness is so small that it tends to be difficult to achieve sufficient dispersion and it tends to deteriorate the physical properties. Meanwhile, if the diameter exceeds the upper limit, too large a size leads to a foreign object and could produce a starting point of destruction, which may tend to cause a deterioration in tensile properties and the like. Additionally, the carbon nanotubes are preferably ones having an average length of 1 nm to 1 mm (more preferably 10 to 100 nm). Additionally, the carbon nanotubes are preferably ones having an aspect ratio of 1 to 1000 (more preferably 10 to 100). If the length or the aspect ratio is less than the lower limit, fineness is so small that it tends to be difficult to achieve sufficient dispersion and it tends to deteriorate the physical properties. Meanwhile, if the length or the aspect ratio exceeds the upper limit, too large a size leads to a foreign object and could produce a starting point of destruction, which may tend to cause a deterioration in tensile properties and the like.

As such carbon nanotubes, commercially available products can be used as appropriate. For example, ED, EP, and HP manufactured by TOMOE Engineering Co., Ltd.; EC 1.0, EC 1.5, and EC 2.0 manufactured by Meijo Nano Carbon Co., Ltd.; 9000, 9100, and 9110 manufactured by MARUBENI INFORMATION SYSTEMS CO., LTD.; ZeonanoSG101 manufactured by ZEON Corporation; dispersions and polymer masterbatches thereof; and the like can be used.

In addition, as the carbon-based filler according to the present invention, carbon blacks and carbon nanotubes can be used preferably as described above. Among them, carbon blacks are more preferable and Ketjen black is particularly preferable from the viewpoint of the balance of cost and performance.

(Composition)

The conductive thermoplastic elastomer composition of the present invention contains the elastomer component, the clay, the paraffin oil, and the carbon-based filler having a BET specific surface area of 50 $m^2/g$ or more.

Note that although it is not exactly clear why the conductive thermoplastic elastomer composition of the present invention makes it possible to obtain the effects of the present invention as described above, the present inventors speculate as follows. Specifically, first, the elastomer component in the present invention contains an elastomeric polymer containing a side chain having at least a hydrogen-bond cross-linkable moiety (a polymer containing at least any of: the side chain (a); the side chain (a') and the side chain (b); and the side chain (c) in a side chain(s)). For this reason, when such an elastomeric polymer is used in combination with a clay, a paraffin oil, and a carbon-based filler, interactions between the clay and hydrogen-bond cross-linkable moieties first occur (such as the formation of new hydrogen bonds), so that the elastomer component undergoes plane cross-linking by utilizing the surface of the clay. Then, the formation of the plane cross-linking uniformizes the cross-linking points by a covalent bond and a hydrogen bond to improve tensile physical properties. In addition, when the elastomer component having such plane cross-linking formed therein is allowed to contain a paraffin oil in a specific amount, flowability is improved and processability is improved. Moreover, when the composition containing those components is used in combination with a carbon-based filler having a BET specific surface area of 50 $m^2/g$ or more, the paraffin oil serves as a lubricating component to sufficiently disperse the carbon-based filler. This makes it possible to exhibit a sufficiently high level of conductivity. At the same time, it is possible to achieve a sufficiently high level of resistance to compression set because the rubber is easily deformed thanks to the paraffin oil. The above description is the speculation of the present inventors.

Note that, the present inventors speculate that, when an elastomer component containing a covalent-bond cross-linking moiety in a side chain is contained in the present invention (for example, when the elastomeric polymer (B) is contained), the side chains containing the covalent-bond cross-linking moieties make it possible to express a higher level of resistance to compression set. Moreover, when the hydrogen-bond cross-linkable moiety and the covalent-bond cross-linking moiety are present in the elastomer component (such as cases where: the elastomeric polymer (B) is contained, a mixture of the elastomeric polymer (B) with another elastomeric polymer is contained; a mixture of the elastomeric polymer (A) and the elastomeric polymer (B) is contained; and a mixture of the elastomeric polymer (A) with an elastomeric polymer containing the side chain (b) other than the elastomeric polymer (B) is used), the presence of the hydrogen-bond cross-linkable moiety and the covalent-bond cross-linking moiety enables the obtained composition to simultaneously express a higher level of mechanical strength attributed to covalent bonds during use and a higher level of flowability (formability) attributed to cleavage of hydrogen bonds during heating. The present inventors speculate that, by taking advantage of the above, properties required depending on an application can be exhibited, as appropriate, by changing, as appropriate, the constitution according to the type of a side chain. Note that, the above-described elastomeric polymer having a side chain (b) other than the elastomeric polymer (B) can be obtained by a method in which an elastomeric polymer having a functional group (for example, cyclic acid anhydride group) in a side chain is used, and the elastomeric polymer is reacted with a compound that forms a covalent-bond cross-linking moiety upon a reaction with the functional group (compound that forms a covalent bond) to produce the elastomeric polymer having the side chain (b). Note that, also in this case, the above-described "compound that forms a covalent-bond cross-linking moiety (compound that forms a covalent bond)" can be used as the compound that forms a covalent-bond cross-linking moiety (compound that forms a covalent bond).

Hereinabove, the reasons that the foregoing effects can be obtained by the conductive thermoplastic elastomer composition of the present invention and the other things have been discussed. Hereinafter, preferred embodiments of the conductive thermoplastic elastomer composition of the present invention (such as a preferable condition of the content ratio of each component) will be further explained.

The conductive thermoplastic elastomer composition of the present invention comprises the elastomer component, the clay, the paraffin oil, and the carbon-based filler. The amount of the clay contained (content ratio) in the composition is 20 parts by mass or less relative to 100 parts by mass of the elastomer component. If the amount of the clay contained exceeds the upper limit, the tensile characteristics decrease. The amount of the clay contained in the conductive thermoplastic elastomer composition is more preferably 0.01 to 10 parts by mass, further preferably 0.05 to 5 parts by mass, and particularly preferably 0.08 to 3 parts by mass relative to 100 parts by mass of the elastomer component. If the amount of the clay contained is less than the lower limit, the amount of the clay contained is so small that sufficient effects tend not to be obtained. Meanwhile, if the amount of the clay contained exceeds the upper limit, the cross-linking is so strong that the elongation and the strength tend to decrease rather, making it difficult to use the conductive thermoplastic elastomer composition for various applications (deteriorating the practicability).

In addition, the clay is preferably such that the clay in a single-layer morphology (single-layered clay) be present in the composition. The presence of such a clay in the single-layered morphology can be confirmed by observing the surface of the composition under a transmission electron microscope (TEM).

Moreover, regarding the conductive thermoplastic elastomer composition of the present invention, when randomly selected three or more measurement points in a size of 5.63 µm² on the surface of the conductive thermoplastic elastomer composition are observed under a transmission electron microscope (TEM), 50% or more (more preferably 70% or more, further preferably 80 to 100%, and particularly preferably 85 to 100%) of all the clay based on the number is preferably present as the single-layered clay in all the measurement points. If the ratio of the single-layered clay present is less than the lower limit, the elongation at break and the strength at break tend to be lowered. Note that the ratio (proportion) of such a single-layered clay present can be determined as follows. Specifically, a transmission electron microscope (for example, one manufactured by JEOL Ltd. under the trade name of "JEM-2010") is used; 10 g of the conductive thermoplastic elastomer composition is prepared as a sample; three or more measurement points in a size of 5.63 µm² on the surface of the conductive thermoplastic elastomer composition are each observed; the number of the single-layered clay and the number of the multi-layered clay are determined in each TEM image obtained by such observation; the ratio (proportion) of the single-layered clay present relative to all the clay is calculated for each of the measurement points (each of the TEM images) based on these numbers to determine the above-described ratio. Note that the interlayer distance of montmorillonite having a multi-layered structure before taking the single-layer morphology is about 9.8 angstrom, whereas the interlayer distances of ordinary organically modified clays are about 20 to 40 angstrom (2 to 4 nm). In addition, when an ordinary organically modified clay is dispersed in an organic solvent and single-layers are formed, the interlayer distance thereof is 50 angstrom (>5 nm) or more. Hence, layers may be determined as single-layers based on the fact that the interlayer distance of layers observed in a TEM image is wider than such an interlayer distance. As described above, layers may be determined to be in a single-layer state, for example, based on the fact that the intervals of the layers are 5 nm or more, and, in some cases, layers may be determined to be in a single-layer state based on the fact that the layers have intervals of several tens of nanometers or more, although it depends on the type of the clay.

Note that, in a case where the single-layered clay is contained at the above-described proportion (the abundance ratio) in the composition, the clay is contained more dispersedly than in a case where a multi-layered clay is directly dispersed (this is because the multi-layered clay is decomposed to form a single-layered clay), and hence the clay can be dispersed in the composition with a higher dispersibility. Thus, if the single-layered clay is contained at the above-described proportion in the composition, the higher dispersibility than in the case where the multi-layered clay is present in the composition can be obtained, so that the heat resistance and the tensile strength at break can be enhanced to higher levels. For this reason, it is more preferable the clay in a single-layered state be contained at the above-described proportion, and this causes the clay to be more dispersed, making it possible to more efficiently improve the heat resistance and the tensile strength at break.

In addition, the conductive thermoplastic elastomer composition of the present invention is preferably such that when randomly selected three or more measurement points in a size of 5.63 µm² on the surface of the conductive thermoplastic elastomer composition are observed under a transmission electron microscope, 1 to 100 (more preferably 3 to 80, and further preferably 5 to 50) be dispersed per µm² in all the measurement points. If the number of single layers of the clay is less than the lower limit, the amount of the clay is so small that a sufficient effect tends not to be obtained. Note that the number of the single layers of the clay can be determined by obtaining a TEM image by the same method as that for measuring the ratio of presence (proportion) of the single-layered clay.

In addition, in the conductive thermoplastic elastomer composition of the present invention, the amount of the paraffin oil contained (content ratio) needs to be 1 to 65% by mass relative to the total amount of the composition (total amount of all components contained in the composition (including, if contained, additional components as well as the elastomer component, the clay, the paraffin oil, and the carbon-based filler)). If the content ratio of the paraffin oil is less than the lower limit, it is difficult to maintain the compression set at a sufficiently high level. Meanwhile, if the content ratio of the paraffin oil exceeds the upper limit, it is difficult to maintain the conductivity at a sufficiently high level and to exhibit the conductivity and the compression set at sufficiently high levels in a well-balanced manner. The content ratio of the paraffin oil is preferably 5 to 65% by mass and more preferably 10 to 65% by mass from the same viewpoints. In addition, the content ratio of the paraffin oil is more preferably 25 to 60% by mass (further preferably 35 to 60% by mass and particularly preferably 40 to 60% by mass) from the viewpoint that it is possible to achieve a higher level of balance between compression set and conductivity.

In addition, in the conductive thermoplastic elastomer composition of the present invention, the amount contained (content ratio) of the carbon-based filler (carbon-based filler having a BET specific surface area of 50 m²/g or more) is preferably 0.1 to 50% by mass, more preferably 0.3 to 40% by mass, further preferably 2.0 to 30% by mass, and particularly preferably 3.0 to 20% by mass relative to the total amount of the composition (total amount of all components contained in the composition (including, if contained, additional components as well as the elastomer component, the clay, the paraffin oil, and the carbon-based filler)). If the amount of the carbon-based filler contained is less than the lower limit, the surface resistivity and the volume resistivity tend to increase, making it not necessarily possible to achieve a sufficiently high level of conductivity. Meanwhile, if the amount of the carbon-based filler contained exceeds the upper limit, the workability of mixing the elastomer with the carbon-based filler tends to reduce, which may deteriorate the performance of the composition obtained (conductivity in particular).

Note that, in the conductive thermoplastic elastomer composition of the present invention, properties depending on an application can be also imparted, as appropriate, according to a type of an elastomer component used. For example, in a conductive thermoplastic elastomer composition containing the elastomeric polymer (A) as the elastomer component, the properties stemming from the side chain (a) can be imparted to the composition, and therefore the elongation at break, tensile strength at break, and flowability, in particular, can be improved. Meanwhile, in a conductive thermoplastic elastomer composition containing the elastomeric polymer (B) as the elastomer component, the properties stemming from the covalent-bond cross-linking moiety in the side chain can be imparted to the composition, and therefore the resistance to compression set, in particular, can be improved. Note that, in a conductive thermoplastic elastomer composition containing the elastomeric polymer (B) as the elastomer component, not only the properties stemming from the covalent-bond cross-linking moiety but also the properties stemming from the hydrogen-bond cross-linkable moiety (the hydrogen-bond cross-linkable moiety described for the side chain (a')) can be imparted to the composition, and therefore it is also possible to more improve the resistance to compression set while maintaining the flowability (formability). Thus, it is possible to even more efficiently exhibit properties desired for an application by changing the type of the side chain, the type of the polymer (B), and so on, as appropriate.

In addition, regarding the conductive thermoplastic elastomer composition of the present invention, the conductive thermoplastic elastomer composition containing the elastomeric polymer (A) as an elastomer component and the conductive thermoplastic elastomer composition containing the elastomeric polymer (B) as an elastomer component may be produced separately, and then mixed with each other to prepare a conductive thermoplastic elastomer composition containing the elastomeric polymers (A) and (B) as elastomer components. In addition, in the present invention, it is only necessary that at least the elastomeric polymers (A) and (B) be contained as the elastomer component. From the viewpoint of utilizing properties of covalent-bond cross-linking moieties more efficiently by causing a covalent-bond cross-linking moiety to be present in the composition, an additional elastomeric polymer having a side chain (b) other than the elastomeric polymer (B) may be mixed for use. For example, when an additional elastomeric polymer having a side chain (b) other than the elastomeric polymer (B) is used in combination in a case where the elastomeric polymer (A) is used as an elastomer component, it is also possible to provide, owing to the side chains contained in the composition, substantially the same properties as those of a conductive thermoplastic elastomer composition utilizing the elastomeric polymer (B) containing a hydrogen-bond cross-linkable moiety and a covalent-bond cross-linking moiety in a side chain. In addition, when the conductive thermoplastic elastomer composition containing the elastomeric polymers (A) and (B) as elastomer components is produced, or when a conductive thermoplastic elastomer composition containing the elastomeric polymer (A) and the additional elastomeric polymer having a side chain (b) other than the elastomeric polymer (B) is produced, desired properties can also be exhibited, as appropriate, by changing, as appropriate, the ratio of these components (for example, the components including the elastomeric polymer (A) and the elastomeric polymer (B)).

In addition, when the conductive thermoplastic elastomer composition of the present invention contains the elastomeric polymers (A) and (B) as elastomer components, the content ratio of the elastomeric polymer (A) to the elastomeric polymer (B) is preferably 1:9 to 9:1, and more preferably 2:8 to 8:2 in terms of the mass ratio ([polymer (A)]:[polymer (B)]). If the content ratio of the polymer (A) is less than the lower limit, the flowability (formability) and the mechanical strength tend to be insufficient. Meanwhile, if the content ratio of the polymer (A) exceeds the upper limit, the resistance to compression set tends to decrease.

Moreover, when the conductive thermoplastic elastomer composition of the present invention contains the elastomeric polymer (A) and an additional elastomeric polymer having a side chain (b) other than the elastomeric polymer (B) (hereinafter, sometimes referred to as "elastomeric polymer (C)") as elastomer components, the content ratio of the elastomeric polymer (A) to the elastomeric polymer (C) is preferably 1:9 to 9:1, and more preferably 2:8 to 8:2 in terms of mass ratio ([elastomeric polymer (A)]:[elastomeric polymer (C)]). If the content ratio of the polymer (A) is less than the lower limit, the flowability (formability) and the mechanical strength tend to be insufficient. Meanwhile, if the content ratio of the polymer (A) exceeds the upper limit, the resistance to compression set tends to decrease.

In addition, regarding the conductive thermoplastic elastomer composition of the present invention, when both the side chain (a') and the side chain (b) are present in the composition, the total amount of the side chain (a') and the total amount of the side chain (b) are preferably 1:9 to 9:1, and more preferably 2:8 to 8:2 based on the mass ratio. If the total amount of the side chain (a') is less than the lower limit, the flowability (formability) and the mechanical strength tend to be insufficient. Meanwhile, if the total amount of the side chain (a') exceeds the upper limit, the resistance to compression set tends to decrease. Note that such a side chain (a') is a concept including the side chain (a). For this reason, also when only the side chain (a) is contained as the side chain (a'), it is preferable that both the side chain (a) and the side chain (b) be present in the composition at the above-described mass ratio.

Unless the object of the present invention is not impaired, the conductive thermoplastic elastomer composition of the present invention may contain, as needed, various kinds of additives or the like, such as polymers other than the elastomer component (for example, a styrene block copolymer containing no chemical-bond cross-linking moiety (polymer having a styrene block), an α-olefin-based resin having no chemical-bond cross-linking moiety (such as an α-olefin homopolymer or an α-olefin copolymer), reinforcing agents (bulking agents), hydrogen bond reinforcing agents (bulking agents), bulking agents to which amino groups are introduced (hereinafter, simply referred to as "amino group-introduced bulking agent"), amino group-containing compounds other than the amino group-introduced bulking agents, compounds containing metal elements (hereinafter, simply referred to as "metal salts"), maleic anhydride-modified polymers, anti-aging agents, antioxidants, pigments (dyes), plasticizers, thixotropy-imparting agents, ultraviolet absorbers, flame retardants, solvents, surfactants (including leveling agents), dispersing agents, dehydrating agents, corrosion inhibitors, tackiness agents, antistats, and fillers. These additives or the like are not particularly limited, and commonly used ones (publicly known ones) can be used as appropriate. For example, polymers other than the elastomer component, anti-aging agents, antioxidants, pigments (dyes), and plasticizers described below can be used as appropriate.

As the polymers other than the elastomer component, any publicly known polymer to be used as appropriate in the field of thermoplastic elastomers for the purposes of adjusting the hardness, maintaining the mechanical physical properties, and doing the like can be used as appropriate without particular limitation, and examples thereof include a styrene block copolymer containing no chemical-bond cross-linking moiety (polymer having a styrene block) and an α-olefin-based resin having no chemical-bond cross-linking moiety. As the polymers other than the elastomer component, an additional elastomeric polymer having aside chain (b) other than the elastomeric polymer (B), a styrene block copolymer containing no chemical-bond cross-linking moiety (polymer having a styrene block), and an α-olefin-based resin having no chemical-bond cross-linking moiety can be used preferably.

In addition, the styrene block copolymer (polymer having a styrene block) which can preferably be used as a polymer other than the elastomer component is one having no chemical-bond cross-linking moiety. The "chemical-bond cross-linking moiety" mentioned herein means a moiety in which a cross linkage is formed by a chemical bond such as a hydrogen bond, a covalent bond, a chelate formed between a metal ion and a polar functional group, and a bond formed by σ-π interaction in a metal-unsaturated bond (double bond, triple bond). Accordingly, "having no chemical-bond cross-linking moiety" mentioned in the present invention means a state where a resin does not have any chemical bond such as the hydrogen bond, the covalent bond, the chelate formed between a metal ion and a polar functional group, or the bond formed by σ-π interaction in a metal-unsaturated bond (double bond, triple bond) listed above. For this reason, as the styrene block copolymer having no chemical-bond cross-linking moiety, preferably used is a copolymer that neither contains any functional group (for example, a hydroxy group, a carbonyl group, a carboxyl group, a thiol group, an amide group, or an amino group) capable of forming a cross-linking point by chemical bonding, nor contains a bonding moiety with which polymer chains are directly cross-linked (such as a cross-linking moiety by a covalent bond). Moreover, such a styrene block copolymer having no chemical-bond cross-linking moiety is a polymer that does not have at least any of the aforementioned side chain (a), side chain (a'), side chain (b), side chain (c), and the like.

Then, the "styrene block copolymer" mentioned herein may be a polymer having a styrene block structure in any moiety. In general, the styrene block copolymer has a styrene block structure. Moieties of the styrene block structures are flocculated to form physically cross-linking points (physically pseudo-cross-linking points) at normal temperature, and the physically pseudo-cross-linking points decompose when heated. Based on these properties, the styrene block copolymer is usable as a thermoplastic substance having rubber-like properties (such as elasticity) at normal temperature.

From the viewpoint that the rubber elasticity and thermoplasticity can be both achieved, preferable copolymers as the styrene block copolymer having no chemical-bond cross-linking moiety include a styrene-isoprene-styrene block copolymer (SIS), a styrene-ethylene-propylene-styrene block copolymer (SEPS), styrene-ethylene-ethylene-propylene-styrene block copolymer (SEEPS), a styrene-butadiene-styrene block copolymer (SBS), a styrene-ethylene-butylene-styrene block copolymer (SEBS), a styrene-isoprene-butadiene-styrene block copolymer (SIBS), and products thereof generated by addition of hydrogen (so-called hydrogenated products). Among them, SEBS and SEEPS are more preferable. One of these styrene block copolymers may be used alone, or two or more thereof may be used in combination.

Then, as the styrene block copolymer having no chemical-bond cross-linking moiety, a styrene block copolymer is preferable in which the styrene content is 20 to 40% by mass (more preferably, 25 to 37% by mass). If the styrene content is less than the lower limit, the thermoplasticity tends to decrease due to a decrease in the styrene block component. Meanwhile, if the styrene content exceeds the upper limit, the rubber elasticity tends to decrease due to a decrease in the olefin component. Here, the styrene content in the styrene block styrene block copolymer can be measured by a method in accordance with the IR method described in JIS K6239 (published in 2007).

Moreover, the weight average molecular weight (Mw) of the styrene block copolymer having no chemical-bond cross-linking moiety is preferably 200,000 to 700,000, both inclusive, more preferably 300,000 to 600,000, both inclusive, and further preferably 350,000 to 550,000, both inclusive. If the weight average molecular weight is less than the lower limit, the heat resistance tends to decrease. Meanwhile, if the weight average molecular weight exceeds the upper limit, the compatibility with the elastomeric polymer tends to decrease.

Further, the number average molecular weight (Mn) of the styrene block copolymer having no chemical-bond cross-linking moiety is preferably 100,000 to 600,000, both inclusive, more preferably 150,000 to 550,000, both inclusive, and further preferably 200,000 to 500,000, both inclusive. If the number average molecular weight is less than the lower limit, the heat resistance tends to decrease. Meanwhile if the number average molecular weight exceeds the upper limit, the compatibility with the elastomeric polymer (the aforementioned elastomer component) tends to decrease.

In addition, the polydispersity index (Mw/Mn) of the styrene block copolymer having no chemical-bond cross-linking moiety is preferably 5 or less, and more preferably 1 to 3. Here, these weight average molecular weight (Mw), number average molecular weight (Mn) and polydispersity index (Mw/Mn) can be determined by what is termed gel permeation chromatography (GPC). Then, "Prominence GPC system" manufactured by Shimadzu Corporation can be used for a specific instrument and conditions for measuring such molecular weights and so on.

Further, the glass-transition point of the styrene block copolymer having no chemical-bond cross-linking moiety is preferably −80 to −40° C., and more preferably −70 to −50. If the glass-transition point is less than the lower limit, the melting point is so low that the heat resistance tends to decrease. Meanwhile if the glass-transition point exceeds the upper limit, the rubber elasticity tends to decrease. Here, the "glass-transition point" mentioned herein is a glass transition point measured by differential scanning calorimetry (DSC) as described above. In such DSC measurement, it is preferable to set the rate of temperature rise at 10° C./min.

A method for producing the styrene block copolymer having no chemical-bond cross-linking moiety is not particularly limited, but any known method can be employed as appropriate. As such a styrene block copolymer, a commercially available product may be used, and it is possible to use, as appropriate, any of copolymers: manufactured by Kraton Corporation under the trade names of "G1633", "G1640", "G1641", "G1642", "G1643", "G1645", "G1650", "G1651", "G1652", "G1654", "G1657", and "G1660"; manufactured by KURARAY CO., LTD. under the trade names of "S4055", "S4077", "S4099", "S8006", "S4044", "S8006", "S4033", "S8004", "S8007", and "S8076"; manufactured by Asahi Kasei Corporation under the trade names of "Tuftec H1041", "Tuftec N504", "Tuftec H1272", "Tuftec M1911", "Tuftec M1913", and "Tuftec MP10"; and manufactured by ARONKASEI CO., LTD. under the trade names of "AR-710", "AR-720", "AR-731", "AR-741", "AR-750", "AR-760", "AR-770", "AR-781", and "AR-791"; and the like, for example.

Moreover, when the conductive thermoplastic elastomer composition of the present invention further contains the styrene block copolymer having no chemical-bond cross-linking moiety, the amount of the contained styrene block copolymer having no chemical-bond cross-linking moiety is preferably 5 to 60% by mass, more preferably 7 to 45% by mass, and further preferably 10 to 30% by mass relative to the total amount of the conductive thermoplastic elastomer composition. If the amount of the contained styrene block copolymer having no chemical-bond cross-linking moiety is less than the lower limit, the amount of the contained styrene block copolymer is so small that the sufficient effects tend not to be obtained particularly in the flowability and the processability. Meanwhile, if the amount of the contained styrene block copolymer exceeds the upper limit, the properties peculiar to the base structure of the cross-linked elastomer (the aforementioned properties stemming from the elastomer component) tend to be weak.

In addition, the α-olefin-based resin which can preferably be used as a polymer other than the elastomer component is one having no chemical-bond cross-linking moiety. As the α-olefin-based resin having no chemical-bond cross-linking moiety, preferably used is a resin that neither contains any functional group (for example, a hydroxy group, a carbonyl group, a carboxyl group, a thiol group, an amide group, or an amino group) capable of forming a cross-linking point by chemical bonding, nor contains a bonding moiety in which polymer chains are directly cross-linked (such as a cross-linking moiety by a covalent bond). Moreover, such an α-olefin-based resin having no chemical-bond cross-linking moiety is a polymer that does not have at least any of the aforementioned side chain (a), side chain (a'), side chain (b), side chain (c), and the like.

Then, the "α-olefin-based resin" mentioned herein is an α-olefin homopolymer or an α-olefin copolymer. The "α-olefin" mentioned herein is an alkene containing a carbon-carbon double bond at the α position (alkene containing a carbon-carbon double bond at the terminal: note that such an alkene may be in the form of a linear chain or a branched chain, and preferably has 2 to 20 carbon atoms (more preferably 2 to 10 carbon atoms). Examples thereof include ethylene, propylene, 1-butene, 1-pentene, 1-hexene, 1-heptene, 1-octene, 1-nonene, 1-decene, and the like.

The α-olefin-based resin having no chemical-bond cross-linking moiety may be any polymer of α-olefin (ploy-α-olefin: which may be a homopolymer or a copolymer), which is not limited to a particular one. Examples thereof include polyethylene, polypropylene, ethylene-propylene copolymer, ethylene-butene copolymer, propylene-ethylene-butene copolymer, and the like. Among the α-olefin-based resins having no chemical-bond cross-linking moiety, polypropylene, polyethylene, and ethylene-propylene copolymer are preferable from the viewpoint of compatibility with the base elastomer. Incidentally, one of these α-olefin-based resins having no chemical-bond cross-linking moiety may be used alone or two or more thereof may be used in combination.

In the α-olefin-based resin having no chemical-bond cross-linking moiety, the degree of crystallinity is preferably 10% or more, more preferably 10 to 80%, and further preferably 10 to 75%. If the degree of crystallinity is less than the lower limit, the resinous properties are so weak that it tends to be difficult to enhance the levels of mechanical properties and flowability. Meanwhile, if the degree of crystallinity exceeds the upper limit, the resinous properties are so strong that it tends to be difficult to exert the mechanical properties at higher levels in a well-balanced manner. Here, the degree of crystallinity can be obtained in such away that diffraction peaks are measured by using an X-ray diffraction instrument (for example, one manufactured by Rigaku Corporation under the trade name "Mini-Flex 300") as a measurement instrument and an integral ratio between the scattering peaks derived from crystalline and amorphous structures is calculated.

In addition, in the α-olefin-based resin having no chemical-bond cross-linking moiety, the melt flow rate (MFR) at 190° C. under a load of 2.16 kg, which is measured according to JIS K6922-2 (published in 2010), is preferably 40 g/10 min or more. If the melt flow rate (MFR) is less than the lower limit, the α-olefin-based resin tends to have difficulty in improving the flowability even when blended in the elastomer composition. Here, the melt flow rate (MFR) is a value measured according to the B method described in JIS K6922-2 (published in 2010) and can be obtained by using, as a melt flow rate measurement instrument, an instrument manufactured by Toyo Seiki Seisaku-sho, Ltd. under the trade name "Melt Indexer G-01". Specifically, 3 g of the α-olefin-based resin is added to the furnace of the instrument, is heated to a temperature of 190° C., and then is left for 5 minutes at 190° C. Thereafter, under the conditions of the temperature kept at 190° C. and a load of 2.16 kg, a mass (g) of the elastomer is measured, as the melt flow rate, which flows out for 10 minutes from an opening of the tubular orifice member having a diameter of 1 mm and a length of 8 mm, and connected to a lower portion of the furnace (the resin is left for 5 minutes at temperature of 190° C. in the furnace, and then the measurement of the mass of the elastomer flowing out is started after the start of the load application).

Moreover, the weight average molecular weight (Mw) of the α-olefin-based resin having no chemical-bond cross-linking moiety is preferably 10,000 to 2,000,000, both inclusive, more preferably 30,000 to 1,500,000, both inclusive, and further preferably 50,000 to 1,250,000, both inclusive. If the weight average molecular weight is less than the lower limit, the mechanical strength tends to decrease. Meanwhile, if the weight average molecular weight exceeds the upper limit, the compatibility with the elastomer component decreases so much that phase separation tends to easily occur.

In addition, the number average molecular weight (Mn) of the α-olefin-based resin having no chemical-bond cross-linking moiety is preferably 10,000 to 2,000,000, both inclusive, more preferably 30,000 to 1,500,000, both inclusive, and further preferably 50,000 to 1,250,000, both inclusive. If the number average molecular weight is less than the lower limit, the mechanical strength tends to decrease. Meanwhile, if the number average molecular weight exceeds the upper limit, the compatibility with the elastomer component tends to decrease so much that phase separation tends to easily occur.

In addition, the polydispersity index (Mw/Mn) of the α-olefin-based resin having no chemical-bond cross-linking moiety is preferably 100 or less, and more preferably 1.5 to 50. If the value of the polydispersity index (Mw/Mn) is less than the lower limit, the flowability tends to decrease. Meanwhile, if the value exceeds the upper limit, the compatibility with the elastomer tends to decrease.

The aforementioned weight average molecular weight (Mw), number average molecular weight (Mn) and polydispersity index (Mw/Mn) of the α-olefin-based resin can be determined by what is termed gel permeation chromatography (GPC). Then, "Prominence GPC system" manufactured by Shimadzu Corporation can be used for a specific instrument and conditions for measuring such molecular weights and so on.

The glass-transition point of the α-olefin-based resin having no chemical-bond cross-linking moiety is preferably −150 to 5° C., and more preferably −125 to 0° C. If the glass transition point is less than the lower limit, the melting point is so low that the heat resistance tends to decrease. Meanwhile, if the glass transition point exceeds the upper limit, the rubber elasticity of the elastomer blended with the α-olefin-based resin tends to decrease. The "glass transition point" mentioned herein is a glass transition point measured by differential scanning calorimetry (DSC) as described above. In such DSC measurement, it is preferable to set the rate of temperature rise at 10° C./min.

A method for producing the α-olefin-based resin having no chemical-bond cross-linking moiety is not particularly limited, but any known method can be employed as appropriate. As such an α-olefin-based resin, a commercially available product may be used, and examples thereof usable as appropriate include ones manufactured by Mitsui Chemicals, Inc. under the trade name "TAFMER"; manufactured by Japan Polyethylene Corporation under the trade names "NOVATEC HD", "NOVATEC LD", "NOVATEC LL", and "KERNEL"; manufactured by Prime Polymer Co., Ltd. under the trade names "HI-NEX", "NEO-ZEX", "ULTZEX", "Evolue", "Prime Polypro", "POLY FINE", and "MOSTRON L"; and manufactured by SunAllomer Ltd. under the name of PP; and the like.

As the anti-aging agents, for example, hindered phenol-based compounds, aliphatic and aromatic hindered amine-based compounds, and other compounds can be used, as appropriate. In addition, as the antioxidants, for example, butylhydroxytoluene (BHT), butylhydroxyanisole (BHA), and the like can be used, as appropriate. Meanwhile, as the pigments, for example, inorganic pigments such as titanium dioxide, zinc oxide, ultramarine, red iron oxide, lithopone, lead, cadmium, iron, cobalt, aluminum, hydrochloric acid salts, and sulfuric acid salts; organic pigments such as azo pigments and copper phthalocyanine pigments; and the like can be used as appropriate. Meanwhile, as the plasticizers, for example, derivatives of benzoic acid, phthalic acid, trimellitic acid, pyromellitic acid, adipic acid, sebacic acid, fumaric acid, maleic acid, itaconic acid, citric acid, and the like, as well as polyester, polyether, or epoxy-based plasticizers, and the like can be used as appropriate. Note that, as the additives and the like, those listed as examples in Japanese Unexamined Patent Application Publication No. 2006-131663 may also be used, as appropriate.

The amount of the additive contained is not particularly limited and can be changed as appropriate depending on the intended purpose or design. For example, when the additive is the α-olefin-based resin having no chemical-bond cross-linking moiety, it is more preferable that the additive be used such that the amount contained is 250 parts by mass or less (more preferably 5 to 250 parts by mass, further preferably 10 to 225 parts by mass, particularly preferably 25 to 200 parts by mass, and most preferably 35 to 175 parts by mass) relative to 100 parts by mass of the elastomer component from the viewpoint that the flowability is improved and thus the dispersibility of the additive is improved, making it possible to obtain a higher effect. Additionally, when the additive is the styrene block copolymer having no chemical-bond cross-linking moiety, it is preferable that the additive be used such that the amount contained is 10 to 400 parts by mass (more preferably 15 to 350 parts by mass, further preferably 20 to 310 parts by mass, particularly preferably 20 to 300 parts by mass, and most preferably 30 to 250 parts by mass) relative to 100 parts by mass of the elastomer component. If the amount of the contained styrene block copolymer is less than the lower limit, the sufficient effects of containing the styrene block copolymer tend not to be obtained particularly in the flowability and the processability. Meanwhile, if the amount of the styrene block copolymer contained exceeds the upper limit, the properties peculiar to the base structure of the cross-linked elastomer (the aforementioned properties stemming from the elastomer component) tend to be weak. Moreover, when the additive is an anti-aging agent, an antioxidant, a pigment (dye), or a plasticizer, the amount of those components is, for each component, preferably 20 parts by mass or less and more preferably 0.1 to 10 parts by mass relative to 100 parts by mass of the elastomer component. As described above, additional components such as additives can be used as appropriate depending on the intended purpose or design.

Note that, when the conductive thermoplastic elastomer composition of the present invention is heated (for example, heated to 100 to 250° C.), dissociation or the like of hydrogen bonds formed at the hydrogen-bond cross-linkable moieties and other cross-linking structures occurs, so that the conductive thermoplastic elastomer composition softens to provide flowability. This is presumably because the heating weakens the interaction (interaction mainly by hydrogen bonds) created between side chains intermolecularly or intramolecularly. Note that an elastomer component containing at least a hydrogen-bond cross-linkable moiety in a side chain is contained in the present invention. Owing to the above feature, when the conductive thermoplastic elastomer composition is left after the flowability is provided by the heating, the dissociated hydrogen bonds again form the bonds to harden the conductive thermoplastic elastomer composition. Hence, it is also possible to cause the conductive thermoplastic elastomer composition to express recyclability more efficiently depending on the constitution.

In addition, the conductive thermoplastic elastomer composition of the present invention has a volume resistivity of preferably 300 Ω·cm or less, more preferably 150 Ω·cm or less, further preferably 100 Ω·cm or less, further preferably 50 Ω·cm or less, particularly preferably 10 Ω·cm or less, and most preferably 1 Ω·cm or less. If the volume resistivity exceeds the upper limit, the conductivity tends to decrease. In addition, the lower limit value of the volume resistivity is desirably as close to 0 as possible from the viewpoint of conductivity, but is not particularly limited. Note that the method as follows is employed as a method for measuring the "volume resistivity." Specifically, first, a measurement instrument manufactured by Kawaguchi Electric Works Co., Ltd. under the trade name of "Digital Ohm Meter Model R-506" is used, a measurement electrode manufactured by Kawaguchi Electric Works Co., Ltd. under the trade name of "Model P-617" is used, test pieces having a rectangular shape with a length of 150 mm, a width of 20 mm, and a thickness of 1.8 mm are prepared as measurement samples, the test environment temperature is set to 23±2° C., the test environment humidity (relative humidity) is set to 50±5% RH, the applied current is changed for each test to 1 μA (first test), 10 μA (second test), and 100 μA (third test), and measurement by the parallel terminal electrode method according to JIS K 6271 (published in 2008) under the condition that the distance between different-potential electrodes is 60 mm is carried out to perform three times a test of recording a measurement value (measured value of the volume resistivity) one minute after the start of measurement (Measurement is carried out such that the test piece is replaced with a new one for each test. For this reason, the number of the above test pieces prepared is three. In addition, the magnitude of the applied current is changed for each test under the above conditions). The value calculated by obtaining the average value of the measurement values in the tests is employed as the "volume resistivity." As described above, the volume resistivity employed is the average value of the measurement values of the three tests (measured values of the three test pieces) for volume resistivity, which are measured by the parallel terminal electrode method according to JIS K 6271 (published in 2008). Note that it is preferable the test pieces be prepared by cutting a sheet, formed by pre-heating the conductive thermoplastic elastomer composition at 200° C. for 3 minutes followed by hot pressing at 200° C. for 5 minutes, to the size described above.

In addition, in the conductive thermoplastic elastomer composition of the present invention, the compression set (unit: %) measured after being compressed by 25% according to JIS K6262 (published in 2013) and left at 70° C. for 22 hours is preferably 60% or less, more preferably 55% or less, further preferably 40% or less, particularly preferably 30% or less, and most preferably 25% or less. If the compression set exceeds the upper limit, permanent deformation tend to occur in some cases. Note that the value of the compression set (unit: %) can be employed as follows. A compressor manufactured by DUMBBELL CO., LTD. under the trade name of "Vulcanized Rubber Compression Set Test Machine SCM-1008 L" is used. The conductive thermoplastic elastomer composition is pre-heated at 200° C. for 3 minutes and hot pressed at 200° C. for 5 minutes to form a sheet having a thickness of about 2 mm. From the sheet thus obtained, seven sheets having a disk shape with a diameter of 29 mm are punched out, and stacked on each other to prepare a sample with a height (thickness) of 12.5±0.5 mm. Using the test pieces thus obtained as a sample, the test pieces are compressed by 25% with a dedicated jig for use in the compressor, and left at 70° C. for 22 hours. After that, the compression set (unit: %) is measured according to JIS K6262 (published in 2013).

Further, in the conductive thermoplastic elastomer composition of the present invention, the melt flow rate (MFR) measured at 230° C. under a load of 10 kg according to JIS K6922-2 (published in 2010) is preferably 2 g/10 min or more, more preferably 4 g/10 min or more, and more preferably 8 g/10 min. If the melt flow rate (MFR) is less than the lower limit, there is a tendency that the sufficient processability cannot be expressed. Here, the melt flow rate (MFR) is a value measured according to the B method described in JIS K6922-2 (published in 2010) and can be obtained by using, as a melt flow rate measurement instrument, an instrument manufactured by Toyo Seiki Seisakusho, Ltd. under the trade name "Melt Indexer G-01". Specifically, 3 g of the conductive thermoplastic elastomer composition is added to the furnace of the instrument, is heated to a temperature of 230° C., and then is left for 5 minutes at 230° C. Thereafter, under the conditions of the temperature kept at 230° C. and a load of 10 kg, a mass (g) of the elastomer is measured, as the melt flow rate, which flows out for 10 minutes from an opening of the tubular orifice member having a diameter of 1 mm and a length of 8 mm, and connected to a lower portion of the furnace (the composition is left for 5 minutes at temperature of 230° C. in the furnace, and then the measurement of the mass of the elastomer flowing out is started after the start of the load application).

Further, in the conductive thermoplastic elastomer composition of the present invention, a 5% weight loss temperature is preferably 320° C. or above, and more preferably 325° C. or above. If the 5% weight loss temperature is less than the lower limit, the heat resistance tends to decrease. Here, the 5% weight loss temperature can be obtained by: preparing 10 mg of a conductive thermoplastic elastomer composition as a measurement sample; using a thermogravimetric analyzer (TGA) as a measurement instrument to heat the conductive thermoplastic elastomer composition at a rate of temperature rise of 10° C./min; and measuring a temperature at which the weight loss reaches 5% of the initial weight.

The conductive thermoplastic elastomer composition of the present invention is preferable as an electromagnetic shielding material for containers that store electronic devices such as computers and communication devices, grounding wire of electronic parts and the like, and a joining member used for members such as material for preventing ignition due to sparks caused by static electricity such as triboelectricity. In addition, the conductive thermoplastic elastomer composition of the present invention is preferably used in applications such as removal of static electricity caused by ascending and descending friction in gas and oil tanks, floor materials for gunpowder factory, operating room, computer room, and the like, electromagnetic wave shielding materials for electrification of a work table, antistatic materials, and the like.

The conductive thermoplastic elastomer composition of the present invention can exhibit various properties in a well-balanced manner depending on its composition. Specifically, it is possible to cause the conductive thermoplastic elastomer composition to exhibit properties required depending on an application (for example, properties such as a self-repairing property) as appropriate, by changing the constitution as appropriate. For example, the conductive thermoplastic elastomer composition of the present invention can even exhibit properties such as sufficient hardness and sufficient elongation at break. Thus, properties required depending on an application of the conductive thermoplastic elastomer composition can be exhibited as appropriate in a well-balanced manner by changing the constitution as appropriate. Hence, in a case of using a conductive thermoplastic elastomer composition for any of the above-described various applications, it is preferable to use the conductive thermoplastic elastomer composition with the types (constitution) of components in the composition changed as appropriate in consideration of the properties required depending on the application.

Hereinabove, the conductive thermoplastic elastomer composition of the present invention is described. Next, a method is described below, which can be preferably used as a method for producing the above-described conductive thermoplastic elastomer composition of the present invention.

The method for producing the conductive thermoplastic elastomer composition of the present invention is not particularly limited, and examples thereof include a method (A) comprising:
 mixing
 an elastomeric polymer having a cyclic acid anhydride group in a side chain,
 the clay,
 the paraffin oil,
 the carbon-based filler having a BET specific surface area of 50 m$^2$/g or more, and
 at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group,
such that the content ratio of each of the clay and the paraffin oil is in the above-described range in the finally obtained composition (range of the amount contained described for the conductive thermoplastic elastomer composition of the present invention), to allow a reaction to proceed between the elastomeric polymer having a cyclic acid anhydride group in a side chain and the raw material compound, thereby obtaining the conductive thermoplastic elastomer composition of the present invention.

In the method (A), the order or the like of mixing the components is not particularly limited, and an optimum method may be employed as appropriate depending on the intended design, the device to be used, and the like. Among such methods (A), it is preferable to employ the following method (A-1) from the viewpoints that it is possible to achieve a higher level of clay dispersibility and to achieve a higher level of rubber property. Specifically, a preferred embodiment of the method (A) as described above can include a method (A-1) comprising:

a first step of mixing the elastomeric polymer having a cyclic acid anhydride group in a side chain, the clay, and the paraffin oil to obtain a mixture;

a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining a thermoplastic elastomer composition (precursor of a conductive thermoplastic elastomer composition); and a third step of mixing, in the thermoplastic elastomer composition, a carbon-based filler having a BET specific surface area of 50 m$^2$/g or more, thereby obtaining the conductive thermoplastic elastomer composition of the present invention, wherein the first step includes mixing the elastomeric polymer having a cyclic acid anhydride group in a side chain, the clay, and the paraffin oil such that the content ratio of each of the clay and the paraffin oil is in the above-described range in the composition (so as to satisfy the conditions on the amounts of the clay and the paraffin oil contained, described for the conductive thermoplastic elastomer composition of the present invention), and the thermoplastic elastomer composition obtained in the second step (precursor of a conductive thermoplastic elastomer composition) is a composition comprising: at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; the clay; and the paraffin oil. Here, first, description is provided for the steps of the method (A-1), which can be preferably used as the above method (A).

(First Step)

The first step in the above method (A-1) is a step of mixing an elastomeric polymer having a cyclic acid anhydride group in a side chain, a clay, and a paraffin oil to obtain a mixture.

Here, the "elastomeric polymer having a cyclic acid anhydride group in a side chain" refers to an elastomeric polymer in which a cyclic acid anhydride group is chemically stably bonded (covalently bonded) to an atom forming the main chain of the polymer. For example, it is preferable to use a product obtained by a reaction of a polymer that can form a main chain portion of the elastomeric polymer (A) or (B) with a compound capable of introducing a cyclic acid anhydride group.

Note that the polymer that can form a main chain portion is not particularly limited, as long as the polymer is generally a natural polymer or synthetic polymer having a glass-transition point of room temperature (25° C.) or lower (as long as the polymer is a so-called elastomer).

Examples of the polymers that can form the main chain portions of the elastomeric polymers (A) and (B) include diene-based rubbers such as natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), and ethylene-propylene-diene rubber (EPDM), and hydrogenated products thereof; olefin-based rubbers such as ethylene-propylene rubber (EPM), ethylene-acrylic rubber (AEM), ethylene-butene rubber (EBM), chlorosulfonated polyethylene, acrylic rubber, fluororubber, polyethylene rubber, and polypropylene rubber; epichlorohydrin rubber; polysulfide rubber; silicone rubber; urethane rubber; and the like.

In addition, the polymer that can form the main chain portion of the elastomeric polymer (A) or (B) may also be an elastomeric polymer containing a resin component, and examples thereof include optionally hydrogenated polystyrene-based elastomeric polymers (for example, SBS, SIS, SEBS, and the like), polyolefin-based elastomeric polymers, polyvinyl chloride-based elastomeric polymers, polyurethane-based elastomeric polymers, polyester-based elastomeric polymers, polyamide-based elastomeric polymers, and the like.

Moreover, the polymer that can form the main chain portion of the elastomeric polymer (A) or (B) preferably comprises at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers. In addition, the polymer is preferably a diene-based rubber from the viewpoints of the ease of introduction of a maleic anhydride group preferred as the cyclic acid anhydride group, and the like, and is preferably an olefin-based rubber from the viewpoint of anti-ageing properties.

Meanwhile, examples of the compound capable of introducing a cyclic acid anhydride group include cyclic acid anhydrides such as succinic anhydride, maleic anhydride, glutaric anhydride, phthalic anhydride, and derivatives thereof.

In addition, the cyclic acid anhydride group of the elastomeric polymer having a cyclic acid anhydride group in a side chain used in the first step is preferably a succinic anhydride group, a maleic anhydride group, a glutaric anhydride group, or a phthalic anhydride group. Especially, a maleic anhydride group is more preferable, from the viewpoints that the raw material has high reactivity and further the raw material is industrially readily available.

Moreover, the elastomeric polymer having a cyclic acid anhydride group in aside chain used in the first step may be produced by a commonly used method, for example, by a method of graft polymerization of a cyclic acid anhydride onto a polymer that can form the main chain portion of the elastomeric polymer (A) or (B) under commonly employed conditions, for example, by stirring under heating or the like.

In addition, it is also possible to use a commercially available product as the elastomeric polymer having a cyclic acid anhydride group in a side chain used in the first step.

Examples of commercially available products of the elastomeric polymer having a cyclic acid anhydride group in a side chain include maleic anhydride-modified isoprene rubbers such as LIR-403 (manufactured by KURARAY CO., LTD.) and LIR-410A (prototype provided by KURARAY CO., LTD.); modified isoprene rubbers such as LIR-410 (manufactured by KURARAY CO., LTD.); carboxy-modified nitrile rubbers such as Krynac 110, 221, and 231 (manufactured by Polysar Rubber Corporation); carboxy-modified polybutenes such as CPIB (manufactured by Nippon Petrochemicals Co., Ltd.) and HRPIB (prototype provided by the laboratory of Nippon Petrochemicals Co., Ltd.); maleic anhydride-modified ethylene-propylene rubbers such as Nucrel (manufactured by DUPONT-MITSUI POLYCHEMICALS CO., LTD), Yukaron (manufactured by Mitsubishi Chemical Corporation), TAFMER M (for example, MP0610 (manufactured by Mitsui Chemicals, Inc.), and MP0620 (manufactured by Mitsui Chemicals, Inc.)); maleic anhydride-modified ethylene-butene rubbers such as TAFMER M (for example, MA8510, MH7010, MH7020 (manufactured by Mitsui Chemicals, Inc.), MH5010, MH5020 (manufactured by Mitsui Chemicals, Inc.), and MH5040 (manufactured by Mitsui Chemicals, Inc.)); maleic anhydride-modified polyethylenes such as Adtex series (maleic anhydride-modified EVA, maleic anhydride-modified EMA (manufactured by Japan Polypropylene Corporation)), HPR series (maleic anhydride-modified EEA, maleic anhydride-modified EVA (manufactured by DuPont-Mitsui Polyolefin)), Bondfast series (maleic anhydride-modified EMA (manufactured by Sumitomo Chemical Company, Limited)), Dumilan series (maleic anhydride-modified EVOH (manufactured by Takeda Pharmaceutical Company Limited)), Bondine (ethylene-acrylic acid ester-maleic anhydride ternary copolymer (manufactured by ATOFINA)), Tuftec (maleic anhydride-modified SEBS, M1943 (manufactured by Asahi Kasei Corporation)), Kraton (maleic anhydride-modified SEBS, FG1901, FG1924 (manufactured by Kraton Polymers)), Tufprene (maleic anhydride-modified SBS, 912 (manufactured by Asahi Kasei Corporation)), Septon (maleic anhydride-modified SEPS (manufactured by KURARAY CO., LTD.)), Rexpearl (maleic anhydride-modified EVA, ET-182G, 224M, 234M (manufactured by Japan Polypropylene Corporation)), and Auroren (maleic anhydride-modified EVA, 200S, 250S (manufactured by NIPPON PAPER Chemicals CO., LTD.)); maleic anhydride-modified polypropylenes such as ADMER (for example, QB550, LF128 (manufactured by Mitsui Chemicals, Inc.)); and the like.

In addition, the elastomeric polymer having a cyclic acid anhydride group in a side chain is more preferably a maleic anhydride-modified ethylene-propylene rubber or a maleic anhydride-modified ethylene-butene rubber from the viewpoints of high molecular weight and high strength.

Moreover, the clay used in the first step is the same as the clay described for the above-described conductive thermoplastic elastomer composition of the present invention (the preferable clays are also the same). In addition, the paraffin oil used in the method is the same as the paraffin oil described for the conductive thermoplastic elastomer composition of the present invention (the preferable paraffin oils are also the same). In addition, the carbon-based filler used in the method is the same as the carbon-based filler described for the conductive thermoplastic elastomer composition of the present invention (the preferable carbon-based fillers are also the same).

Then, in the first step, the elastomeric polymer having a cyclic acid anhydride group in a side chain, the clay, and the paraffin oil are mixed together to obtain the mixture. In this mixture preparation step, an order of addition of the elastomeric polymer having a cyclic acid anhydride group in a side chain, the clay, and the paraffin oil is not limited to a particular order. However, from the viewpoint of more improving the dispersibility of the clay, it is preferable to prepare a mixture precursor containing the paraffin oil and the elastomeric polymer having a cyclic acid anhydride group in a side chain, and thereafter to add the clay to the precursor.

In addition, in adding the clay to obtain the mixture, it is preferable to plasticize the elastomeric polymer having a cyclic acid anhydride group in a side chain in advance and thereafter to add the clay so that the clay can be sufficiently dispersed, and it is more preferable to plasticize the mixture precursor and thereafter to add the clay thereto.

A method for plasticizing an elastomeric polymer having a cyclic acid anhydride group in a side chain or the mixture precursor is not limited to a particular one, and for example it is possible to employ, as appropriate, a method of mastication using rolls, a kneader, an extruder, an all-purpose mixer, or the like at temperature which allows these to be plasticized (for example, about 100 to 250° C.), or the like. The conditions such as temperature for plasticizing the elastomeric polymer having a cyclic acid anhydride group in a side chain or the mixture precursor are not particularly limited, and may be set, as appropriate, according to the type of a component contained (for example, the type of the elastomeric polymer having a cyclic acid anhydride group in a side chain) and the like.

In addition, the first step includes mixing the elastomeric polymer having a cyclic acid anhydride group in a side chain, the clay, and the paraffin oil such that the content ratio of each of the clay and the paraffin oil is in the above-described range in the composition (so as to satisfy the conditions on the amounts of the clay and the paraffin oil contained, described for the conductive thermoplastic elastomer composition of the present invention).

In the mixture preparation step, the elastomeric polymer having a cyclic acid anhydride group in a side chain, the clay, and the paraffin oil are preferably mixed by using the clay at such a ratio that the amount of the clay contained in the finally obtained conductive thermoplastic elastomer composition is 20 parts by mass or less (more preferably 0.01 to 10 parts by mass, further preferably 0.05 to 5 parts by mass, and particularly preferably 0.08 to 3 parts by mass) relative to 100 parts by mass of the elastomer component. If the amount of the clay contained exceeds the upper limit, the cross-linking is so strong that the elongation and the strength tend to decrease rather. Meanwhile, if the amount of the clay contained is less than the lower limit, the amount of the clay is so small that the effects obtained by the use of the clay tend to decrease.

In addition, the amount of the clay contained in the mixture is preferably 20 parts by mass or less, more preferably 0.05 to 5 parts by mass, and further preferably 0.08 to 3 parts by mass, relative to 100 parts by mass of the elastomeric polymer having a cyclic acid anhydride group in a side chain. If the content is less than the lower limit, the amount of the clay is so small that the effect obtained by using the clay tends to be lowered. Meanwhile, if the content exceeds the upper limit, the cross-linking is so strong that the elongation and the strength tend to be lowered rather.

Note that when the clay is used at such a content, the amount of the clay contained in the finally obtained conductive thermoplastic elastomer composition takes a value within the above-described range.

Moreover, the amount of the clay used for forming such a mixture is preferably such that the clay be contained at such a ratio that the amount of the clay is 0.01 g to 2.0 g (more preferably 0.02 to 1.0 g) per millimole of the cyclic acid anhydride group in the elastomeric polymer having a cyclic acid anhydride group in a side chain. If the ratio of the clay to the acid anhydride group is less than the lower limit, the amount is so small that the effect tends to be lowered. Meanwhile, if the ratio exceeds the upper limit, the cross-linking is so strong that the elongation and the strength tend to be lowered rather. Note that when the clay is contained within such a range of ratio, the clay introduced into the mixture is efficiently decomposed, so that the single-layered clay tends to be produced efficiently, and the dispersibility of the clay tends to be higher.

Still further in the mixture preparation step, the elastomeric polymer having a cyclic acid anhydride group in a side chain, the clay, and the paraffin oil are preferably mixed by using the paraffin oil at such a ratio that the amount of the paraffin oil contained in the finally obtained conductive thermoplastic elastomer composition is 1 to 65% by mass (preferably 5 to 65% by mass and more preferably 10 to 65% by mass). If the amount of the paraffin oil contained is less than the lower limit, the flowability and the dispersibility tend to be insufficient. Meanwhile, if the amount of the paraffin oil contained exceeds the upper limit, the oil tends to easily bleed.

A mixing method for obtaining the mixture is not limited to a particular one, but any publicly known method or the like can be employed as appropriate. For example, it is possible to employ a method of mixing with rolls, a kneader, an extruder, an all-purpose mixer, or the like.

Note that, unless the object of the present invention is not impaired, the mixture can contain as appropriate the various additives described above (various kinds of additives, such as polymers other than the elastomer component (for example, a styrene block copolymer containing no chemical-bond cross-linking moiety (polymer having a styrene block), an α-olefin-based resin having no chemical-bond cross-linking moiety (such as an α-olefin homopolymer or an α-olefin copolymer), reinforcing agents (bulking agents), hydrogen bond reinforcing agents (bulking agents), bulking agents to which amino groups are introduced (hereinafter, simply referred to as "amino group-introduced bulking agent"), amino group-containing compounds other than the amino group-introduced bulking agents, compounds containing metal elements (hereinafter, simply referred to as "metal salts"), maleic anhydride-modified polymers, anti-aging agents, antioxidants, pigments (dyes), plasticizers, thioxotropy-imparting agents, ultraviolet absorbers, flame retardants, solvents, surfactants (including leveling agents), dispersing agents, dehydrating agents, corrosion inhibitors, tackiness agents, antistats, and fillers). These additives or the like are not particularly limited, and commonly used ones can be used as appropriate.

These components such as additives (additional components) are the same as the components described for the conductive thermoplastic elastomer composition of the present invention, and can be used by appropriately changing the amount contained and the like depending on the intended design. For example, it is preferable that the additives, whose preferable ranges of the amount contained have been described for the conductive thermoplastic elastomer composition of the present invention, be used by appropriately changing the amount used such that their amounts are in the already described ranges. For example, if the additive is the α-olefin-based resin, it is more preferable to use the α-olefin-based resin such that the amount contained is, as mentioned above, 250 parts by mass or less (more preferably 5 to 250 parts by mass, further preferably 10 to 225 parts by mass, particularly preferably 25 to 200 parts by mass, and most preferably 35 to 175 parts by mass) relative to 100 parts by mass of the elastomer component. In addition, if the additive is the styrene block copolymer having no chemical-bond cross-linking moiety, it is preferable to use the styrene block copolymer such that the amount contained is 10 to 400 parts by mass (more preferably 15 to 350 parts by mass, further preferably 20 to 310 parts by mass, particularly preferably 20 to 300 parts by mass, and most preferably 30 to 250 parts by mass) relative to 100 parts by mass of the elastomer component.

In addition, if the additive is a reinforcing agent (bulking agent), it is preferable to use the reinforcing agent such that the amount contained is 500 parts by mass or less (more preferably 20 to 400 parts by mass) relative to 100 parts by mass of the elastomer component. If the amount of the reinforcing agent (bulking agent) contained is less than the lower limit, the effect of the use of the reinforcing agent (bulking agent) tends not to be expressed sufficiently. Meanwhile, if the amount of the reinforcing agent (bulking agent) contained exceeds the upper limit, the effect of the elastomer serving as a substrate tends to be less influential, so that physical properties tend to deteriorate, although it depends on the type of the component used. In addition, if the additive is the plasticizer (including a softening agent), it is preferable to use the plasticizer such that the amount contained is 600 parts by mass or less (more preferably 10 to 600 parts by mass, further preferably 50 to 550 parts by mass, particularly preferably 75 to 500 parts by mass, and most preferably 100 to 400 parts by mass) relative to 100 parts by mass of the elastomer component. In addition, if the additive is other than the polymer and the plasticizer, it is preferable to use the additive such that the amount of the additive contained is 20 parts by mass or less (more preferably 0.1 to 10 parts by mass) relative to 100 parts by mass of the elastomer component. If the amount of the additive contained is less than the lower limit, the effect of the use of the additive tends not to be expressed sufficiently. Meanwhile, if the amount of the additive contained exceeds the upper limit, the additive adversely affects the reaction of the elastomer serving as a substrate, so that the physical properties tend to deteriorate rather.

(Second Step)

The second step is a step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining a thermoplastic elastomer composition (precursor of a conductive thermoplastic elastomer composition: the composition before the introduction of the carbon-based filler).

As the compound (I) that forms a hydrogen-bond cross-linkable moiety upon a reaction with the cyclic acid anhydride group, the same compound as the compound that forms a hydrogen-bond cross-linkable moiety (the compound capable of introducing a nitrogen-containing heterocycle) described for the above-described conductive thermoplastic elastomer composition of the present invention can be used preferably. For example, the compound (I) may be the nitrogen-containing heterocycle described for the above-described conductive thermoplastic elastomer composition of the present invention itself, or may be a compound in which a substituent (for example, a hydroxy group, a thiol group, an amino group, or the like) that reacts with acyclic acid anhydride group of maleic anhydride or the like is bonded to the above-described nitrogen-containing heterocycle (a nitrogen-containing heterocycle having the above-described substituent). Note that, as the compound (I), a compound that forms both a hydrogen-bond cross-linkable moiety and a covalent-bond cross-linking moiety (a compound capable of simultaneously introducing both a hydrogen-bond cross-linkable moiety and a covalent-bond cross-linking moiety) may be used (note that a side chain having both a hydrogen-bond cross-linkable moiety and a covalent-bond cross-linking moiety can be considered as a preferred mode of the side chain having a hydrogen-bond cross-linkable moiety).

In addition, the compound (I) is not particularly limited, and it is possible to select and use, as appropriate, a preferred compound among the above-described compounds (I) according to the type of the side chain (the side chain (a) or the side chain (a')) in the target polymer. The compound (I) is preferably triazole, pyridine, thiadiazole, imidazole, isocyanurate, triazine, and hydantoins optionally having at least one substituent selected from hydroxy groups, thiol groups, and amino groups, more preferably triazole, pyridine, thiadiazole, imidazole, isocyanurate, triazine, and hydantoin having the above-described substituent, further preferably triazole, isocyanurate, or triazine having the above-described substituent, and particularly preferably triazole having the above-described substituent from the viewpoint that a higher reactivity can be obtained. Note that examples of the triazole, pyridine, thiadiazole, imidazole, and hydantoin optionally having the substituents include 4H-3-amino-1,2,4-triazole, aminopyridine, aminoimidazole, aminotriazine, aminoisocyanurate, hydroxypyridine, hydroxyethyl isocyanurate, and the like.

Meanwhile, as the compound (II) that forms a covalent-bond cross-linking moiety upon a reaction with the cyclic acid anhydride group, a compound which is the same as the "compound that forms a covalent-bond cross-linking moiety (the compound that forms a covalent bond)" described for the above-described conductive thermoplastic elastomer composition of the present invention can be used preferably (compounds preferred as the compound (II) are also the same). In addition, as the compound (II), a compound that forms both a hydrogen-bond cross-linkable moiety and a covalent-bond cross-linking moiety (a compound capable of simultaneously introducing both a hydrogen-bond cross-linkable moiety and a covalent-bond cross-linking moiety) may also be used (note that a side chain having both a hydrogen-bond cross-linkable moiety and a covalent-bond cross-linking moiety can be considered as a preferred mode of the side chain having a covalent-bond cross-linking moiety).

The compound (II) is preferably tris(hydroxyethyl) isocyanurate, sulfamide, or polyether polyol, more preferably tris(hydroxyethyl) isocyanurate or sulfamide, and further preferably tris(hydroxyethyl) isocyanurate, from the viewpoint of resistance to compression set.

Then, as the compound (I) and/or (II), it is preferable to use a compound having at least one substituent among hydroxy groups, thiol groups, amino groups, and imino groups from the viewpoint of introducing a hydrogen-bond cross-linkable moiety. Moreover, as the compound (I) and/or (II), it is preferable to use a compound that forms both of a hydrogen-bond cross-linkable moiety and a covalent-bond cross-linking moiety by reacting with the cyclic acid anhydride group (a compound that can introduce both of a hydrogen-bond cross-linkable moiety and a covalent-bond cross-linking moiety at the same time), because both of the hydrogen-bond cross-linkable moiety and the covalent-bond cross-linking moiety can be introduced more efficiently to the composition. As the compound that forms both of a hydrogen-bond cross-linkable moiety and a covalent-bond cross-linking moiety, the aforementioned heterocycle-containing polyol, heterocycle-containing polyamine, and heterocycle-containing polythiol can be preferably used, and tris(hydroxyethyl) isocyanurate is particularly preferable among them.

In addition, the amount of the compound (I) and the compound (II) added (the total amount thereof: when only one compound is used, the amount of the one compound) is not particularly limited. In a case where active hydrogen of an amine, an alcohol, or the like is contained in the compound, the amount of the compound (I) and the compound (II) is such that the resulting amount of the active hydrogen of an amine, an alcohol, or the like in the compound is preferably 20 to 250% by mole, more preferably 50 to 150% by mole, and further preferably 80 to 120% by mole relative to 100% by mole of the cyclic acid anhydride group. If the amount added is less than the lower limit, the amount of the side chain introduced is reduced, making it difficult to obtain a sufficiently high level of cross-linking density, so that physical properties such as tensile strength tend to be lowered. Meanwhile, if the amount added exceeds the upper limit, the amount of the compound used is so large that many branches tends to be formed, and the cross-linking density tends to be rather lowered.

In addition, regarding the amount of the compound (I) and the compound (II) added, the total amount thereof (when only one compound is used, the amount of the one compound) is preferably 0.1 to 10 parts by mass, more preferably 0.3 to 7 parts by mass, and further preferably 0.5 to 5.0 parts by mass, relative to 100 parts by mass of the polymer (an elastomeric polymer having a cyclic acid anhydride group in a side chain) in the mixture. If the amount of the compound (I) and the compound (II) added (the amount based on parts by mass) is less than the lower limit, the amount is so small that the cross-linking density does not increase, and desired physical properties tend not to be expressed. Meanwhile, if the amount exceeds the upper limit, the amount is so large that many branches tends to be formed, and the cross-linking density tends to be lowered.

When both the compound (I) and the compound (II) are used, the order of addition of the compound (I) and the compound (II) is not particularly limited, and either one may be added first. In addition, when both the compound (I) and the compound (II) are used, the compound (I) may be reacted with part of the cyclic acid anhydride groups in the elastomeric polymer having a cyclic acid anhydride group in a side chain. This also makes it possible to form a covalent-bond cross-linking moiety by a reaction of unreacted cyclic acid anhydride groups (cyclic acid anhydride groups not reacted) with the compound (II). Herein, the "part" is preferably 1% by mole or more and 50% by mole of less relative to 100% by mole of the cyclic acid anhydride group. Within this range, the effect of the introduction of the group derived from the compound (I) (for example, a nitrogen-containing heterocycle or the like) tends to be sufficiently expressed in the obtained elastomeric polymer (B), and the recyclability thereof tends to be further improved. Note that the compound (II) is preferably reacted with the cyclic acid anhydride group such that the cross-linkages formed by the covalent bonds can be in a suitable number (for example, 1 to 3 in one molecule).

When the polymer is reacted with the raw material compound (compound (I) and/or compound (II)), the cyclic acid anhydride group of the polymer undergoes ring-opening, so that the cyclic acid anhydride group and the raw material compound (the compound (I) and/or compound (II)) are chemically bonded to each other. A temperature condition for the reaction (ring-opening of the cyclic acid anhydride group) of the polymer with the raw material compound (the compound (I) and/or compound (II)) is not particularly limited, and may be adjusted to a temperature at which the compound and the cyclic acid anhydride group can react with each other according to the types of the compound and the cyclic acid anhydride group. The temperature condition is preferably 100 to 250° C., and more preferably 120 to 230° C., from the viewpoint that the reaction is allowed to proceed in a moment by softening.

Such a reaction results in the formation of at least a hydrogen-bond cross-linkable moiety at a site where the compound (I) has reacted with the cyclic acid anhydride group. Hence, it is possible to cause a side chain of the polymer to contain a hydrogen-bond cross-linkable moiety (a moiety having a carbonyl-containing group and/or a nitrogen-containing heterocycle, more preferably a moiety having a carbonyl-containing group and a nitrogen-containing heterocycle). The side chain formed (introduced) by the reaction can be one containing the structure represented by the above-described formula (2) or (3).

In addition, at a site where the compound (II) has reacted with a cyclic acid anhydride group during the reaction, at least a covalent-bond cross-linking moiety is formed. Hence, a side chain of the polymer can be one containing a covalent-bonding cross-linking portion (a side chain (b) or a side chain (c)). Thus, side chains formed by such a reaction can be those containing the structures represented by the above-described formulae (7) to (9).

Note that groups (structures) of side chains in such polymers, specifically, unreacted cyclic acid anhydride groups, the structures represented by the above-described formulae (2), (3), and (7) to (9), and the like can be identified by ordinarily used analytic techniques such as NMR or IR spectroscopy.

Through the reaction as mentioned above, it is possible to obtain a composition (precursor of a conductive thermoplastic elastomer composition) comprising:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

a clay having a content ratio of 20 parts by mass or less relative to 100 parts by mass of the elastomer component; and the paraffin oil.

Note that the elastomeric polymer (A) and the elastomeric polymer (B) in the composition thus obtained are the same as the elastomeric polymer (A) and the elastomeric polymer (B) described above for the conductive thermoplastic elastomer composition of the present invention, except that the side chain (a), the side chain (a'), the side chain (b), and the side chain (c) in the polymers are each derived from a reaction with a cyclic acid anhydride group (for example, such as a side chain containing the structure represented by any of the above-described formulae (2), (3), and (7) to (9)).

(Third Step)

The third step is a step of mixing, in the thermoplastic elastomer composition (precursor of a conductive thermoplastic elastomer composition), a carbon-based filler having a BET specific surface area of $m^2/g$ or more, thereby obtaining the conductive thermoplastic elastomer composition of the present invention.

The carbon-based filler having a BET specific surface area of 50 $m^2/g$ or more is the same as the carbon-based filler described for the conductive thermoplastic elastomer composition of the present invention (the preferable carbon-based fillers are also the same).

A method for mixing the carbon-based filler in the thermoplastic elastomer composition (precursor of a conductive thermoplastic elastomer composition) is not limited to a particular one, but any publicly known method or the like can be employed as appropriate. For example, it is possible to employ a method of mixing with rolls, a kneader, an extruder, an all-purpose mixer, or the like. In addition, the conditions for mixing the carbon-based filler are not particularly limited, and the conditions may be appropriately set depending on the type of the mixing apparatus used and the like so that the carbon-based filler is sufficiently dispersed.

Note that the third step preferably includes mixing the carbon-based filler in the thermoplastic elastomer composition (precursor of a conductive thermoplastic elastomer composition) by using the carbon-based filler such that the amount of the contained carbon-based filler in the finally obtained conductive thermoplastic elastomer composition is in the above-described preferable range of the amount of the carbon-based filler contained. Specifically, the third step preferably includes mixing the carbon-based filler in the thermoplastic elastomer composition (precursor of a conductive thermoplastic elastomer composition) by using the carbon-based filler such that the amount of the contained carbon-based filler in the finally obtained conductive thermoplastic elastomer composition is at a ratio of 0.1 to 50% by mass (more preferably 0.3 to 40% by mass, and further preferably 2.0 to 30% by mass, and 3.0 to 20% by mass). If the amount of the carbon-based filler contained is less than the lower limit, the surface resistivity and the volume resistivity tend to increase. Meanwhile, if the amount of the carbon-based filler contained exceeds the upper limit, the workability of mixing the elastomer with the carbon-based filler tends to reduce, deteriorating the performance of the composition obtained.

Note that, as the carbon-based filler, the present invention uses one having a BET specific surface area of 50 $m^2/g$ or more (one having a relatively large specific surface area) as described above, and mixes the carbon-based filler with the elastomer component, the clay, and the paraffin oil at least when obtaining the composition being the final product. The present inventors speculate that the finally obtained conductive thermoplastic elastomer composition has a sufficient level of resistance to compression set because, in the above mixing step, the paraffin oil in the composition serves as a lubricating component to sufficiently disperse the carbon-based filler in the composition, making it possible to obtain a sufficiently high level of conductivity, and the rubber is easily deformed thanks to the paraffin oil.

In addition, in the case of using a mixing method including the first step to the third step as described above, it is possible to allow the composition to more efficiently contain a single-layered clay and to disperse the clay. In this respect, the present inventors speculate as follows. Specifically, consider the case of using a mixing method including the first step to the third step. In the first step, by mixing the clay with the elastomeric polymer having a cyclic acid anhydride group in a side chain (hereinafter, sometimes referred to as "acid anhydride-containing polymer") to disperse in advance the clay in the acid anhydride polymer, the acid anhydride groups and the clay interact with each other to facilitate the delamination of layers of the clay. Especially when the clay is an organically modified clay preferably usable in the present invention, the organic material such as an ammonium salt present between layers more efficiently interacts with the acid anhydride. Hence, the organically modified clay tends to cause delamination of the layers more easily. In addition, after the clay is dispersed, the raw material compound (which functions as a cross-linking agent that forms cross linkages, and which is hereinafter sometimes referred to as a "cross-linking agent") is added. Consequently, the cross-linking agent reacts with acid anhydride groups, and at least hydrogen-bond cross-linkable moieties (for example, carboxylic acid groups, or the like) are generated in the system. For this reason, interaction of hydrogen bonds with the clay is caused, and the clay is further dispersed in the elastomer. The present inventors speculate that, in this way, it is possible to allow the composition to more efficiently contain a single-layered clay and to disperse the clay.

In addition, as described above, the conductive thermoplastic elastomer composition of the present invention obtained by using a mixing method including the first step to the third step can be such that a single-layered clay is contained in the composition, and, when randomly selected three or more measurement points in a size of 5.63 $\mu m^2$ on a surface of the conductive thermoplastic elastomer composition are observed under a transmission electron microscope (TEM), 50% or more (more preferably 70% or more, further preferably 80 to 100%, and particularly preferably 85 to 100%) of all the clay based on the number is present as the single-layered clay in all the measurement points. If the ratio of such a single-layered clay present is less than the lower limit, the elongation at break and the strength at break tend to be lowered.

Note that the method (A-1) including the first step to the third step makes it possible to more efficiently adjust the ratio of the clay (single-layered clay) present in the single-layer morphology in the composition to the above-described preferred ratio. Regarding this point, the present inventors speculate that the clay interacts with cyclic acid anhydride groups in the above-described first step, making it possible to more efficiently delaminate layers of the clay having the multi-layered structure, and in turn making it possible to disperse (finely disperse) the clay in the single-layer state, so that the clay in the single-layer morphology (single-layered clay) is present at a higher ratio in the composition, which makes it possible for the composition to contain the single-layered clay at the above-described preferred ratio. Note that the presence of the clay in such a single-layered morphology can be confirmed by observing the surface of the obtained composition under a transmission electron microscope (TEM).

In addition, in the method (A-1) including the first step to the third step, it is also possible to, for example, separately produce a conductive thermoplastic elastomer composition containing an elastomeric polymer (A) as an elastomer component and a conductive thermoplastic elastomer composition containing an elastomeric polymer (B) as an elastomer component, followed by mixing to prepare an conductive thermoplastic elastomer composition containing the elastomeric polymers (A) and (B) as elastomer components. Meanwhile, when a conductive thermoplastic elastomer composition containing a combination of the elastomeric polymers (A) and (B) as elastomer components is produced, it is also possible to cause a desired property to be exhibited by changing the ratio of the elastomeric polymer (A) and the elastomeric polymer (B), as appropriate, to change, as appropriate, the ratio between the hydrogen-bond cross-linkable moieties and the covalent-bond cross-linking moieties present in the composition and the like.

Hereinabove, description has been provided for the steps used in preferred embodiments of the method (A) (method (A-1) including the first step to the third step) which can be used preferably as a method for producing the conductive thermoplastic elastomer composition of the present invention. However, the method (A) is not limited to the above method (A-1).

For example, the method (A-1) is a mixing method including sequentially adding the raw material compound and the carbon-based filler depending on the order of the first step to the third step, and the above-mentioned method (A) is not particularly limited in terms of the order and the like of adding the elastomeric polymer having a cyclic acid anhydride group in a side chain, the clay, the paraffin oil, the carbon-based filler, and the raw material compound. In other words, the above-mentioned method (A) may mix the elastomeric polymer having acyclic acid anhydride group in a side chain, the clay, the paraffin oil, the carbon-based filler, and the raw material compound, and no particular limitation is imposed on the order and the like of adding these.

The method (A) may perform the mixing by simultaneously adding the above-described components (for example, by simultaneously adding a mixture of the components prepared in advance with a blender or the like) in a reaction vessel (such as a heating cylinder of an extruder), or alternatively may perform the mixing by sequentially adding the components in the reaction vessel in the same order as that of the method including the first step to the third step or in an order different from that of the method including the first step to the third step.

In addition, in the method (A), no particular limitation is imposed on the method for mixing the elastomeric polymer having a cyclic acid anhydride group in a side chain, the clay, the paraffin oil, the carbon-based filler, and the raw material compound, to allow a reaction to proceed between the elastomeric polymer and the raw material compound, and a publicly known method can be employed as appropriate. For example, one may preferably employ a method including continuously mixing (continuously kneading) a mixture of these components with an extruder to mix the components, to allow a reaction to proceed between the elastomeric polymer and the raw material compound. As such an extruder, it is preferable to use a multi-screw extruder and it is particularly preferable to use a twin-screw extruder from the viewpoint of adjusting the kneading time.

In addition, consider the case of employing as the method (A) the method including continuous mixing (continuous kneading) with the extruder to allow a reaction to proceed between the elastomeric polymer and the raw material compound. The temperature condition is preferably a temperature described in the first production method mentioned earlier, at which the polymer and the raw material compound (the compound (I) and/or the compound (II)) can react with each other (preferably 100 to 250° C. and more preferably 120 to 230° C.) from the viewpoint of allowing the reaction to efficiently proceed. In addition, the temperature condition in the case of employing the method including continuous mixing (continuous kneading) is more preferably 140 to 249° C. and further preferably 160 to 220° C. If the temperature condition is less than the lower limit, the flowability tends to decrease. Meanwhile, if the temperature condition exceeds the upper limit, thermal deterioration of the polymer component tends to occur, decreasing the tensile strength at break.

In addition, consider the case of employing as the method (A) the method including continuous mixing (continuous kneading) with the extruder to allow a reaction to proceed between the elastomeric polymer and the raw material compound. The properties (shape and the like) of the screw used are not particularly limited, and the design thereof can be changed as appropriate. In addition, the screw is more preferably one satisfying such a relationship between the screw length (L) and the screw diameter (D) that L/D is 30 or more. If such a relationship is satisfied, there is a tendency that the flowability is improved and the tensile strength at break is improved.

In addition, consider the case of employing as the method (A) the method including continuous mixing (continuous kneading) with the extruder to allow a reaction to proceed between the elastomeric polymer and the raw material compound. The rotational speed of the screw is preferably adjusted by an extruder so that the maximum shear rate is 1 to 1599 $sec^{-1}$ (more preferably 50 to 900 $sec^{-1}$ and further preferably 100 to 600 $sec^{-1}$). If the maximum shear rate is less than the lower limit, the flowability tends to decrease. Meanwhile, if the maximum shear rate exceeds the upper limit, the tensile strength at break tends to decrease.

In addition, consider the case of employing as the method (A) the method including continuous mixing (continuous kneading) with the extruder. The order of adding the components used may be changed as appropriate by providing the extruder with supply inlets for the components (the elastomeric polymer having a cyclic acid anhydride group in a side chain, the clay, the paraffin oil, the carbon-based filler, and the raw material compound) and sequentially adding the components in the extruder. Note that it is possible to more efficiently carry out the step of sequentially mixing the components by using such an extruder and employing the method (A-1) including the first step to the third step.

In addition, the method (A) may include mixing such that the content ratio of each of the clay and the paraffin oil is in the above-described range in the composition, and the amounts and the like of additional components used may be adjusted as appropriate depending on the intended design. Note that the method (A) may include a step of further adding additional components such as various kinds of additives unless the object of the present invention is not impaired, as described in the method (A-1) mentioned earlier. In addition, the conditions on the amounts and the like of these additional components are the same as the conditions described in the method (A-1) mentioned earlier (the preferable ranges are also the same).

As described above, it is possible to obtain the conductive thermoplastic elastomer composition of the present invention comprising:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;

the clay;

the paraffin oil; and the carbon-based filler by mixing the elastomeric polymer, the clay, the paraffin oil, the carbon-based filler, and the raw material compound such that the content ratio of each of the clay and the paraffin oil is in the above-described range in the composition (range of the amount contained described for the conductive thermoplastic elastomer composition of the present invention), to allow a reaction to proceed between the elastomeric polymer and the raw material compound.

EXAMPLES

Hereinafter, the present invention is described more specifically on the basis of Examples and Comparative Examples; however, the present invention is not limited to Examples below.

First, methods for evaluating properties of conductive thermoplastic elastomer compositions obtained in Examples and Comparative Examples are described.

<JIS-A Hardness>

Each of the conductive thermoplastic elastomer compositions obtained in Examples and Comparative Examples was used. The conductive thermoplastic elastomer composition was pre-heated at 200° C. for 3 minutes, followed by hot pressing at 200° C. for 5 minutes to prepare a sheet having a thickness of about 2 mm. From the sheet thus obtained, seven pieces having a disk shape with a diameter of 29 mm were punched out, and stacked on each other to prepare a sample with a height (thickness) of 12.5±0.5 mm. Then, the sample thus obtained was measured for the JIS-A hardness according to JIS K6253 (published in 2012).

<Elongation at Break ($E_B$)>

Each of the conductive thermoplastic elastomer compositions obtained in Examples and Comparative Examples was used. First, the conductive thermoplastic elastomer composition was pre-heated at 200° C. for 3 minutes, followed by hot pressing at 200° C. for 5 minutes to prepare a sheet having a thickness of 2 mm. From the sheet thus obtained, test pieces in the No. 3 dumbbell shape were punched out, and subjected to a tensile test at a tensile speed of 500 mm/min according to JIS K6251 (published in 2010) to measure the elongation at break ($E_B$) [unit: %] at room temperature (25° C.)

<Compression Set (C-Set)>

Each of the conductive thermoplastic elastomer compositions obtained in Examples and Comparative Examples was used. First, the conductive thermoplastic elastomer composition was pre-heated at 200° C. for 3 minutes, followed by hot pressing at 200° C. for 5 minutes to prepare a sheet having a thickness of about 2 mm. From the sheet thus obtained, seven pieces having a disk shape with a diameter of 29 mm were punched out, and stacked on each other to prepare a sample with a height (thickness) of 12.5±0.5 mm. Using the sample thus obtained, the sample was compressed by 25% with a dedicated jig, and left at 70° C. for 22 hours. After that, the compression set (unit: %) was measured according to JIS K6262 (published in 2013). Note that the compressor used was one manufactured by DUMBBELL CO., LTD. under the trade name of "Vulcanized Rubber Compression Set Test Machine SCM-1008 L".

<Volume Resistivity>

The volume resistivity of each of the conductive thermoplastic elastomer compositions obtained in Examples and Comparative Examples was obtained as follows. Three test pieces (test pieces having a rectangular shape with a length of 150 mm, a width of 20 mm, and a thickness of 1.8 mm) were prepared from each of the conductive thermoplastic elastomer compositions obtained in Examples and Comparative Examples, and each test piece was subjected to a measurement (test) by the parallel terminal electrode method according to JIS K 6271 (published in 2008: "Rubber, vulcanized or thermoplastic Determination of volume and surface resistivity") under the following test conditions. The measurement values (measured values of volume resistivity for the respective test pieces) obtained in the measurements (three measurements: note that the magnitude of the applied current was changed based on the following conditions for the first, second, and third measurement (on the respective test pieces)) were used to calculate their average value. Note that each measurement (test) recorded the value of volume resistivity observed one minute after the start of measurement as the measurement value (measured value of volume resistivity). In addition, each test piece was prepared by cutting a sheet, formed by pre-heating at 200° C. for 3 minutes followed by hot pressing at 200° C. for 5 minutes, to the size described above.

[Test Conditions]
measurement instrument: Digital Ohm Meter Model R-506 (manufactured by Kawaguchi Electric Works Co., Ltd.)
measurement electrode: Model P-617 (manufactured by Kawaguchi Electric Works Co., Ltd., according to ASTM D991 and SRIS 2301)
measurement sample: test piece having a rectangular shape with a length of 150 mm, a width of 20 mm, and a thickness of 1.8 mm
test environment temperature: 23±2° C.
test environment humidity: 50±5% RH (relative humidity)
applied current: 1 μA (first test), 10 μA (second test), and 100 μA (third test) and
distance between different-potential electrodes: 60 mm.

Example 1

First, 25 g of a styrene-ethylene-butylene-styrene block copolymer (SEBS: manufactured by Kraton Corporation under the trade name of "G1633") was placed into a pressure kneader, 50 g of a paraffin oil (manufactured by Idemitsu Kosan Co., Ltd. under the trade name of "Diana Process Oil PW380", kinematic viscosity: 380 mm$^2$/s, Cp value: 68.0%, aniline point: 143° C.) was dropwise added to the pressure kneader during kneading under the condition of 180° C., and thereby the styrene-ethylene-butylene-styrene block copolymer and the paraffin oil were mixed together for 1 minute. Thereafter, 100 g of a maleic anhydride-modified ethylene-butene copolymer (maleic EBM: manufactured by Mitsui Chemicals, Inc. under the trade name of "TAFMER MH5040", crystallinity: 4%), 150 g of a polyethylene (PE: manufactured by Japan polyethylene Corporation under the trade name of "HJ590N", crystallinity: 74%, MFR: 40 g/10 min (2.16 kg, 190° C.), Mw: 70000), and 0.33 g of an anti-aging agent (manufactured by ADEKA Corporation under the trade name of "AO-50") were further added to the pressure kneader, followed by mastication at temperature of 180° C. for 2 minutes to obtain a first mixture (a mixture of the SEBS, the paraffin oil, the maleic EBM, the PE, and the anti-aging agent). Here, the first mixture was plasticized in the mastication step. Subsequently, 0.1 g of an organically modified clay (manufactured by HOJUN Co., Ltd. under the trade name of "S-VEN WX") was further added to the first mixture in the pressure kneader, followed by kneading for 4 minutes at 180° C. to obtain a second mixture.

Next, 2.62 g of tris(hydroxyethyl) isocyanurate (manufactured by NISSEI CORPORATION under the trade name of "TANAC") was added to the second mixture, followed by mixing for 4 minutes at 180° C. to prepare a thermoplastic elastomer composition (precursor of a conductive thermoplastic elastomer composition).

Thereafter, the thermoplastic elastomer composition (precursor of a conductive thermoplastic elastomer composition) in the pressure kneader was added with 19.7 g of a carbon black (manufactured by Lion Specialty Chemicals Co., Ltd. under the trade name of "Ketjen black EC600JD": Ketjen black, BET specific surface area: 1270 m$^2$/g, average primary particle diameter: 34 nm), followed by mixing at 180° C. for 8 minutes to obtain a conductive thermoplastic elastomer composition.

Note that, from the results of the infrared spectroscopic analysis of the raw material compound used, it can be understood that maleic anhydride groups in the maleic anhydride-modified ethylene-butene copolymer reacted with tris(hydroxyethyl) isocyanurate to form an elastomeric polymer mainly having a side chain containing the structure represented by the following formula (28) (hereinafter, simply referred to as "side chain (iii)" in some cases), among a side chain containing the structure represented by the following formula (26) (hereinafter, simply referred to as "side chain (i)" in some cases), a side chain containing the structure represented by the following formula (27) (hereinafter, simply referred to as "side chain (ii)" in some cases), and the side chain (iii) in the composition. In addition, it was found that the elastomeric polymer had a glass-transition point of 25° C. or below, which was attributable to the main chain made of ethylene and butene.

[Chem. 16]

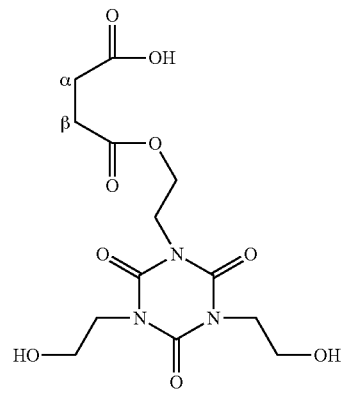

(26)

-continued

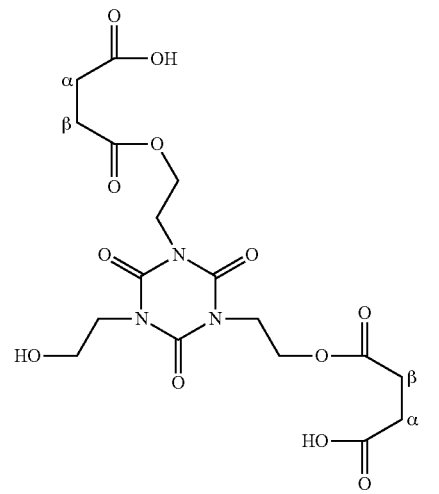
(27)

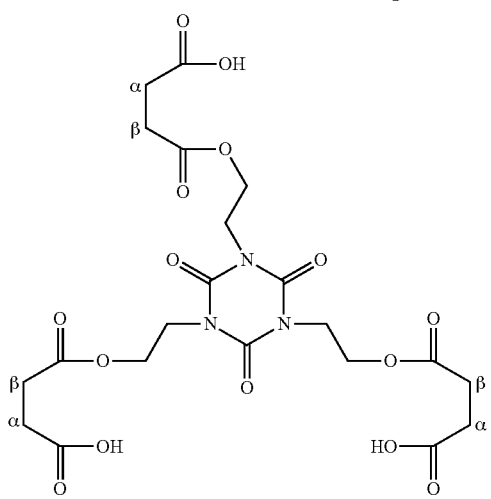
(28)

[in the formulae (26) to (28), the carbons indicated by α and β indicate that the carbon at either position (the α position or the β position) is bonded to the main chain of the elastomeric polymer].

Examples 2 to 7

The conductive thermoplastic elastomer compositions were obtained in the same manner as in Example 1 except that the amounts added (amounts used: unit of g) of the styrene-ethylene-butylene-styrene block copolymer, paraffin oil, anti-aging agent, and Ketjen black were changed to the amounts presented in Table 1 below.

Comparative Example 1

The conductive thermoplastic elastomer composition for comparison was obtained in the same manner as in Example 1 except that the amounts added (amounts used: unit of g) of the styrene-ethylene-butylene-styrene block copolymer, paraffin oil, anti-aging agent, and Ketjen black were changed to the amounts presented in Table 1 below.

Note that Table 1 below presents the amounts added (amounts used) of the raw materials used in Examples 1 to 7 and Comparative Example 1, content ratios of some of the components in the compositions, and the like.

TABLE 1

| | | Example 1 | Example 2 | Example 3 | Example 4 | Example 5 | Example 6 | Example 7 | Comparative Example 1 |
|---|---|---|---|---|---|---|---|---|---|
| Amount of Raw Material Used (Unit: g) | Maleic EBM (manufactured by Mitsui Chemicals, Inc. under the trade name of "TAFMER MH5040") | 100 | 100 | 100 | 100 | 100 | 100 | 100 | 100 |
| | Organically Modified Clay (manufactured by HOJUN Co., Ltd. under the tradename of "S-VEN WX") | 0.1 | 0.1 | 0.1 | 0.1 | 0.1 | 0.1 | 0.1 | 0.1 |
| | Tris(Hydroxyethyl) Isocyanurate (manufactured by NISSEI CORPORATION under the trade name of "TANAC") | 2.62 | 2.62 | 2.62 | 2.62 | 2.62 | 2.62 | 2.62 | 2.62 |
| | Anti-Aging Agent (manufactured by ADEKA Corporation under the trade name of "AO-50") | 0.33 | 0.40 | 0.55 | 0.85 | 1.15 | 1.45 | 1.75 | 2.05 |
| | SEBS (manufactured by Kraton Corporation under the trade name of "G1633") | 25 | 50 | 100 | 200 | 300 | 300 | 300 | 300 |

TABLE 1-continued

|  | Example 1 | Example 2 | Example 3 | Example 4 | Example 5 | Example 6 | Example 7 | Comparative Example 1 |
|---|---|---|---|---|---|---|---|---|
| Polyethylene (PE: manufactured by Japan polyethylene Corporation under the trade name of "HJ590N") | 150 | 150 | 150 | 150 | 150 | 150 | 150 | 150 |
| Paraffin Oil (manufactured by Idemitsu Kosan Co., Ltd. under the trade name of "Diana Process Oil PW380") | 50 | 100 | 200 | 400 | 600 | 900 | 1200 | 1500 |
| Carbon Black (manufactured by Lion Specialty Chemicals Co., Ltd. under the trade name of "Ketjen black EC600JD") | 19.7 | 24.2 | 33.2 | 51.2 | 69.2 | 87.3 | 105.3 | 123.3 |
| Total Amount of Composition (Unit: g) | 347.75 | 427.32 | 586.47 | 904.77 | 1223.07 | 1541.47 | 1859.77 | 2178.07 |
| Content Ratio of Paraffin Oil in Composition (Unit: % by Mass) | 14.4 | 23.4 | 34.1 | 44.2 | 49.1 | 58.4 | 64.5 | 68.9 |
| Content Ratio of Carbon Black in Composition (Unit: % by Mass) | 5.7 | 5.7 | 5.7 | 5.7 | 5.7 | 5.7 | 5.7 | 5.7 |

[Property Evaluation of Conductive Thermoplastic Elastomer Composition]

Table 2 presents the values measured based on the above-mentioned methods for evaluating the properties (compression set, volume resistivity, elongation at break, and JIS-A hardness) of the conductive thermoplastic elastomer compositions obtained in Examples 1 to 7 and Comparative Example 1.

TABLE 2

|  | Example 1 | Example 2 | Example 3 | Example 4 | Example 5 | Example 6 | Example 7 | Comparative Example 1 |
|---|---|---|---|---|---|---|---|---|
| Compression Set (Unit: %) [Measurement Conditions: 70° C., 22H, 25%] | 59 | 53 | 43 | 29 | 22 | 21 | 26 | 25 |
| Volume Resistivity (Unit: Ω·cm) | 12 | 13 | 18 | 31 | 82 | 120 | 200 | 310 |
| Elongation at Break (Unit: %) | 390 | 457 | 411 | 417 | 426 | 424 | 391 | 494 |
| JIS-A Hardness | 92 | 88 | 78 | 63 | 48 | 38 | 29 | 23 |

As is apparent from the results presented in Table 2, it was found that all of the conductive thermoplastic elastomer compositions obtained in Examples 1 to 7 had a volume resistivity of 200 Ω·cm or less and thus had a sufficiently high level of conductivity. In addition, it was found that all of the conductive thermoplastic elastomer compositions obtained in Examples 1 to 7 had a compression set of 59% or less and thus had a sufficiently high level of resistance to compression set. From these results, it was found that all of the conductive thermoplastic elastomer compositions obtained in Examples 1 to 7 had sufficiently high levels of conductivity and resistance to compression set in a well-balanced manner. Conversely, it was found that the conductive thermoplastic elastomer composition obtained in Comparative Example 1 had a volume resistivity of 310 Ω·cm, which was a conductivity lower than those of the conductive thermoplastic elastomer compositions obtained in Examples 1 to 7.

In addition, from the results presented in Table 2, considering the relationship between the amount of paraffin oil and the compression set, it was found that the value of compression set increased as the amount of paraffin oil contained was reduced compared with the conductive thermoplastic elastomer composition prepared in Example 6.

From the results presented in Table 2, in the case where the amount of paraffin oil contained in the conductive thermoplastic elastomer composition is set to 1 to 65% by mass (Examples 1 to 7), it was found that it is possible to obtain a conductive thermoplastic elastomer composition having sufficiently high levels of conductivity and compression set in a well-balanced manner. As described above, in a system of a thermoplastic elastomer composition containing an elastomer component and a clay, it was found that the combination of a carbon black and a specific amount of paraffin oil contained makes it possible to achieve sufficiently high levels of conductivity and compression set in a well-balanced manner.

Note that, as is apparent from the results presented in Table 2, it was also found that the conductive thermoplastic elastomer compositions obtained in Examples 1 to 7 had a sufficiently high level of tensile strength (tensile strength based on the elongation at break). In addition, as is apparent from the results presented in Table 2, the conductive thermoplastic elastomer compositions obtained in Examples 1 to 7 had various hardnesses. From these results, it was found that the conductive thermoplastic elastomer compositions of the present invention (Examples 1 to 7) can have sufficiently high levels conductivity and compression set in a well-balanced manner, can have a sufficiently high level of tensile strength, and further makes it possible to easily adjust the hardness of a final product depending on the application. As described above, it was found that, since the conductive thermoplastic elastomer compositions of the present invention (Examples 1 to 7) can have sufficiently high levels of conductivity, compression set, and tensile strength in a well-balanced manner and can change the hardness to a desired value, it is possible to provide a conductive material capable of achieving a desired hardness depending on the application.

INDUSTRIAL APPLICABILITY

As has been described above, the present invention makes it possible to provide a conductive thermoplastic elastomer composition having conductivity and resistance to compression set at high levels in a well-balanced manner.

As described above, the conductive thermoplastic elastomer composition of the present invention has a sufficiently high level of conductivity and a sufficiently high level of resistance to compression set in a well-balanced manner, and is a thermoplastic elastomer composition which is sufficiently resistant to plastic deformation and is provided with a sufficiently high level of conductivity. Therefore, the conductive thermoplastic elastomer composition of the present invention is preferable as an electromagnetic shielding material for containers that store electronic devices such as computers and communication devices, grounding wire of electronic parts and the like, and a joining member used for members such as material for preventing ignition due to sparks caused by static electricity such as triboelectricity. In addition, the conductive thermoplastic elastomer composition of the present invention is particularly useful in materials and the like for producing products used in applications such as removal of static electricity caused by ascending and descending friction in gas and oil tanks, floor materials for gunpowder factory, operating room, computer room, and the like, electromagnetic wave shielding materials for electrification of a work table, antistatic materials, and the like.

The invention claimed is:

1. A conductive thermoplastic elastomer composition comprising:
   at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below;
   an organically modified clay;
   a paraffin oil; and
   a carbon-based filler having a BET specific surface area of 50 m²/g or more, wherein
   the organically modified clay is a quaternary ammonium salt of a clay, which is a mixture of a dimethylstearyl-benzylammonium salt and a dimethyloctadecylammonium salt,
   a content ratio of the organically modified clay is 20 parts by mass or less relative to 100 parts by mass of the elastomer component, and
   a content ratio of the paraffin oil is 1 to 65% by mass relative to a total amount of the composition.

2. The conductive thermoplastic elastomer composition according to claim 1, wherein
   the carbon-based filler is at least one selected from the group consisting of carbon blacks and carbon nanotubes.

3. The conductive thermoplastic elastomer composition according to claim 1, wherein
   the carbon-based filler has a BET specific surface area of 500 m²/g to 2500 m²/g.

4. The conductive thermoplastic elastomer composition according to claim 1, wherein
   a content ratio of the carbon-based filler is 0.1 to 50% by mass relative to the total amount of the composition.

5. The conductive thermoplastic elastomer composition according to claim 1 wherein
   the clay is montmorillonite.

6. The conductive thermoplastic elastomer composition according to claim 2, wherein
   the carbon-based filler has a BET specific surface area of 500 m²/g to 2500 m²/g.

7. The conductive thermoplastic elastomer composition according to claim 2, wherein
   a content ratio of the carbon-based filler is 0.1 to 50% by mass relative to the total amount of the composition.

8. The conductive thermoplastic elastomer composition according to claim 3, wherein
   a content ratio of the carbon-based filler is 0.1 to 50% by mass relative to the total amount of the composition.

9. The conductive thermoplastic elastomer composition according to claim 6, wherein
   a content ratio of the carbon-based filler is 0.1 to 50% by mass relative to the total amount of the composition.

10. The conductive thermoplastic elastomer composition according to claim 2, wherein
    the clay is montmorillonite.

11. The conductive thermoplastic elastomer composition according to claim 3, wherein
    the clay is montmorillonite.

12. The conductive thermoplastic elastomer composition according to claim 6, wherein
    the clay is montmorillonite.

13. The conductive thermoplastic elastomer composition according to claim 4, wherein
    the clay is montmorillonite.

14. The conductive thermoplastic elastomer composition according to claim 7, wherein
    the clay is montmorillonite.

15. The conductive thermoplastic elastomer composition according to claim 8, wherein
    the clay is montmorillonite.

16. The conductive thermoplastic elastomer composition according to claim 9, wherein
    the clay is montmorillonite.

17. The conductive thermoplastic elastomer composition according to claim 1, which has a volume resistivity of 200 Ω·cm or less, and a compression set of 59% or less.

* * * * *